United States Patent
Kamenetsky et al.

(10) Patent No.: US 7,739,365 B2
(45) Date of Patent: Jun. 15, 2010

(54) METHODS FOR PROVIDING A REPORT DATABASE FOR A PLURALITY OF LOCALIZED DEVICES USING AN ABSTRACTION LAYER AND ATOMIC ERROR HANDLING

(75) Inventors: Mark L. Kamenetsky, Menlo Park, CA (US); Timothy J. Kusumi, Los Gatos, CA (US); Adeline Pang, San Jose, CA (US); Scott K. Pickett, Los Gatos, CA (US); Uthayakumar Kumarasamy, San Jose, CA (US); Dolores Seraphina Atemasov, San Francisco, CA (US)

(73) Assignee: Converged Data Solutions, Inc., Marshall, TX (US)

( * ) Notice: Subject to any disclaimer, the term of this patent is extended or adjusted under 35 U.S.C. 154(b) by 891 days.

(21) Appl. No.: 10/915,588

(22) Filed: Aug. 9, 2004

(65) Prior Publication Data
US 2005/0027848 A1 Feb. 3, 2005

Related U.S. Application Data

(63) Continuation-in-part of application No. 10/324,592, filed on Dec. 19, 2002.

(51) Int. Cl.
*G06F 15/173* (2006.01)
(52) U.S. Cl. ............... 709/223; 709/203; 709/219; 709/222; 709/250
(58) Field of Classification Search ............... 709/203, 709/219, 222, 223, 250
See application file for complete search history.

(56) References Cited

U.S. PATENT DOCUMENTS 5,809,145 A * 9/1998 Slik et al. ............... 705/52

6,041,362 A * 3/2000 Mears et al. ............... 719/310
6,167,448 A 12/2000 Hemphill et al. ............ 709/224
6,266,809 B1 7/2001 Craig ........................ 717/173
6,324,542 B1 * 11/2001 Wright et al. ............. 707/104.1

(Continued)

FOREIGN PATENT DOCUMENTS

WO WO 0161566 8/2001

OTHER PUBLICATIONS

Kimbro Staken, "XML:DB XUpdate Use Cases", undated, (http://www.xmldatabases.org), pp. 1-7.

(Continued)

*Primary Examiner*—Liangche A Wang
(74) *Attorney, Agent, or Firm*—Loudermilk & Associates

(57) ABSTRACT

The present invention discloses improved systems and methods for multisite management of computer server systems and in particular converged communication systems based on a decentralized architecture. Certain and various aspects relating to atomic error handling, transaction-based authentication/security, intelligent bandwidth management, decoupled data/configuration messaging, improved scalability, auto-detection functions, business metrics, etc., also are disclosed. A console is disclosed that communicates with each of a plurality of converged communications systems, e.g., preferably through the use of sockets. The actual traffic load is decentralized among the computer server systems, as each one uses direct connections (e.g., via an enhanced file transfer protocol) to access update/configuration data as needed. In addition, an improved communication protocol is disclosed that is optimized for the multisite management architecture of the present invention. An improved set of graphical user interface (GUI) features are described that improve the efficiency of the management of multiple systems.

17 Claims, 29 Drawing Sheets

U.S. PATENT DOCUMENTS

| | | | | |
|---|---|---|---|---|
| 6,324,578 | B1 | 11/2001 | Cox et al. | 709/223 |
| 6,343,280 | B2 | 1/2002 | Clark | 705/55 |
| 6,438,749 | B1* | 8/2002 | Chamberlain | 717/174 |
| 6,587,842 | B1 | 7/2003 | Watts | 705/57 |
| 6,681,392 | B1 | 1/2004 | Henry | 717/176 |
| 2002/0040469 | A1 | 4/2002 | Pramberger | 717/121 |
| 2002/0059264 | A1* | 5/2002 | Fleming et al. | 707/100 |
| 2003/0046437 | A1* | 3/2003 | Eytchison et al. | 709/250 |
| 2003/0147369 | A1* | 8/2003 | Singh et al. | 370/338 |
| 2003/0195949 | A1* | 10/2003 | Slivka et al. | 709/219 |
| 2003/0233483 | A1 | 12/2003 | Mechione | 719/310 |

OTHER PUBLICATIONS

Fan et al., "XPERANTO: Bridging Relational Technology and XML", 2002, pp. 1-9.

Tim Howes, "LDAP: Use as Directed", Feb. 1, 1999, Network Magazine, (http://www.networkmagazine.com/article/DCM20000502S0039) pp. 1-7.

Microsoft Corporation, "Active Directory Architecture", 2002, pp. 1-36.

SmartPipes, Inc., "Architecture" webpage, undated, pp. 1-4.

SmartPipes, Inc., "Building and Managing IPSec Extranets", 2002, pp. 1-14.

IBM, "The business adnvatage of IBM Tivoli Configuration & Operations", Apr. 2002, pp. 1-8.

U.S. Appl. No. 10/324,592 office action mailed May 22, 2006.
U.S. Appl. No. 10/324,592 amendment of Oct. 23, 2006.
U.S. Appl. No. 10/324,592 office action mailed Jan. 19, 2007.
U.S. Appl. No. 10/324,592 amendment of Apr. 19, 2007.
U.S. Appl. No. 10/324,592 office action mailed Jul. 26, 2007.
U.S. Appl. No. 10/324,592 amendment of Jan. 13, 2008.
U.S. Appl. No. 10/324,592 office action mailed May 13, 2008.
U.S. Appl. No. 10/324,592 amendment of Nov. 13, 2008.
U.S. Appl. No. 10/324,592 office action mailed Dec. 4, 2008.
U.S. Appl. No. 10/324,592 amendment of Apr. 6, 2009.
U.S. Appl. No. 10/324,592 office action mailed Aug. 12, 2009.

* cited by examiner

Creating a recurring task

A submitted recurring task

Project View

Network View

```
<request>
        <id>             1                         </id>
        <sender>         client1                   </sender>
        <recipient>      configuration-service     </recipient>
        <password>       007                       </password>
        <command-list>
                <value-of>
                        <path>   friend-set/friend/name      </path>
                </value-of>
                <update>
                        <path>           friend-set/friend[name='Dilbert']/pet      </path>
                        <value> Dogbert                          </value>
                </update>
        </command-list>
</request>
```

Figure 12

```
<success >
        <id>             1                          </id>
        <sender>         configuration-service      </sender>
        <recipient>      client1                    </recipient>
        <result-list>
                <value-of-result>
                        <value> Dilbert  </value>
                        <value> Wally    </value>
                        <value> Alice    </value>
                </value-of-result>
                <update-result>
                        <match-count>   1           </match-count>
                </update-result>
        </result-list>
</success>
```

```
<invalid-modification-error>
        <id>             1                          </id>
        <sender>         configuration-service      </sender>
        <recipient>      client1                    </recipient>
        <command-index>         2           </command-index>
        ...
</invalid-modification-error>
```

Figure 13

| Error Name | Superclass | Explanation |
|---|---|---|
| invalid-request-error | request-error | The request message itself could not be parsed, validated, or authenticated. |
| insufficient-permission-error | command-error | The sender does not have sufficient permission to execute a particular command in the request message. |
| invalid-modification-error | command-error | A particular command attempted to modify an object, leaving it in an invalid state, violating either our XML conventions or the schema used by the recipient of the request. |

Figure 14

Dialog for FTP Bandwidth

| Command | Behavior |
|---|---|
| value-of | Returns the literal contents of all matching elements. |
| update | Replaces the literal contents of all matching elements with the literal contents of the given value. |
| append | Adds the literal contents of the given value to the end of the literal contents of all matching elements. |
| remove | Removes all matching elements. |

Figure 16

```
<xupdate:append select="list" child="last()">
    <xupdate:element name="record">
        <field1>1        </field1>
        <field2>2        </field2>
    </xupdate:element>
</xupdate:append>
```

Figure 17 (Prior Art)

| Status Detail | | | |
|---|---|---|---|
| Task: | Hotfixes 10/9 HotFix | | |
| Instant Office: | BIGFOOT | | |

| Date | Time | Status | Detail |
|---|---|---|---|
| 10/9/2002 | 4:18:36 PM | Queued | |
| 10/9/2002 | 4:18:37 PM | Sent | |
| 10/9/2002 | 4:13:36 PM | Received | |
| 10/9/2002 | 4:13:37 PM | Verifying | |
| 10/9/2002 | 4:13:56 PM | Scheduled | |
| 10/9/2002 | 4:14:20 PM | CAB Download Started | Getting HF20020927_0_3.CAB from markk-new. |
| 10/9/2002 | 4:14:22 PM | CAB Received | Got HF20020927_0_3.CAB from markk-new. |
| 10/9/2002 | 4:14:23 PM | CAB Download Started | Getting HF20020927_0_4.CAB from markk-new. |
| 10/9/2002 | 4:14:24 PM | CAB Received | Got HF20020927_0_4.CAB from markk-new. |
| 10/9/2002 | 4:14:24 PM | CAB Received | Got 2 out of 2 hotfixes. |
| 10/9/2002 | 6:00:30 PM | Upgrade Started | |
| 10/9/2002 | 6:13:51 PM | Upgrade Complete | |

Figure 18

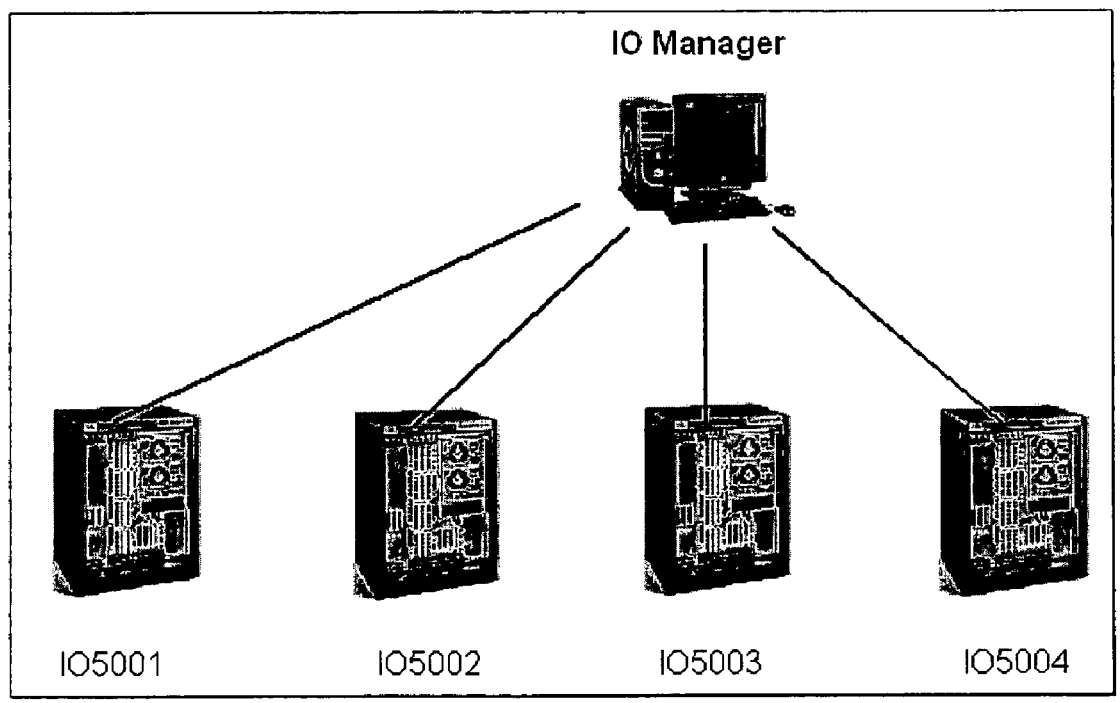
Figure 20 - MSM with no abstraction layer.

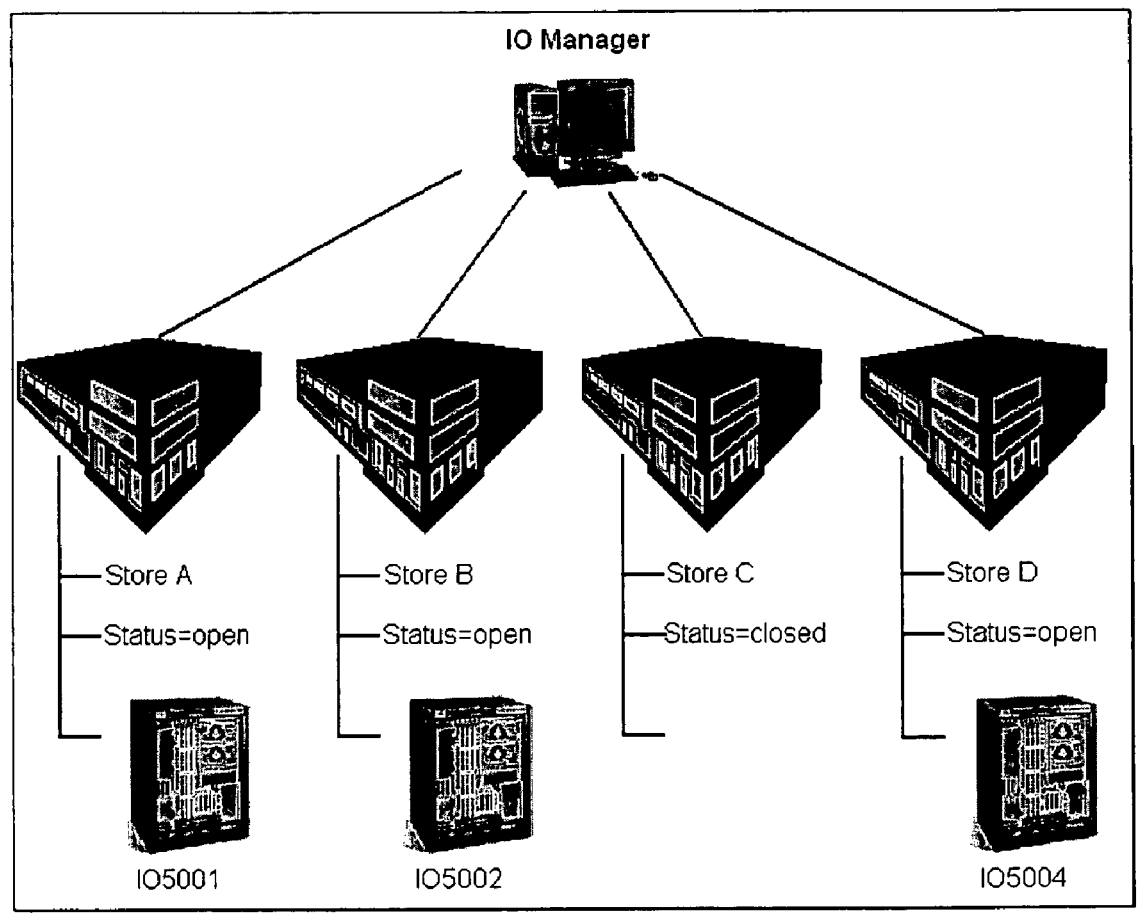
Figure 21 - MSM with business abstraction layer.

| Location Key | Location ID | Status | Equipment Serial# |
|---|---|---|---|
| 1 | Store A | Open | IO5001 |
| 2 | Store B | Open | IO5002 |
| 3 | Store C | Closed | |
| 4 | Store D | Open | IO5004 |

Figure 22 – Location Table for defining the abstraction layer

| Serial# | Model | IPAddress | Software Version |
|---------|-------|-----------|------------------|
| IO5001 | 3000 | 192.168.1.40 | 5.0 |
| IO5002 | 3000 | 192.168.1.22 | 5.1 |
| IO5004 | 5000 | 192.168.32.234 | 5.1 |

Figure 23 - InstantOffice table for defining physical equipment

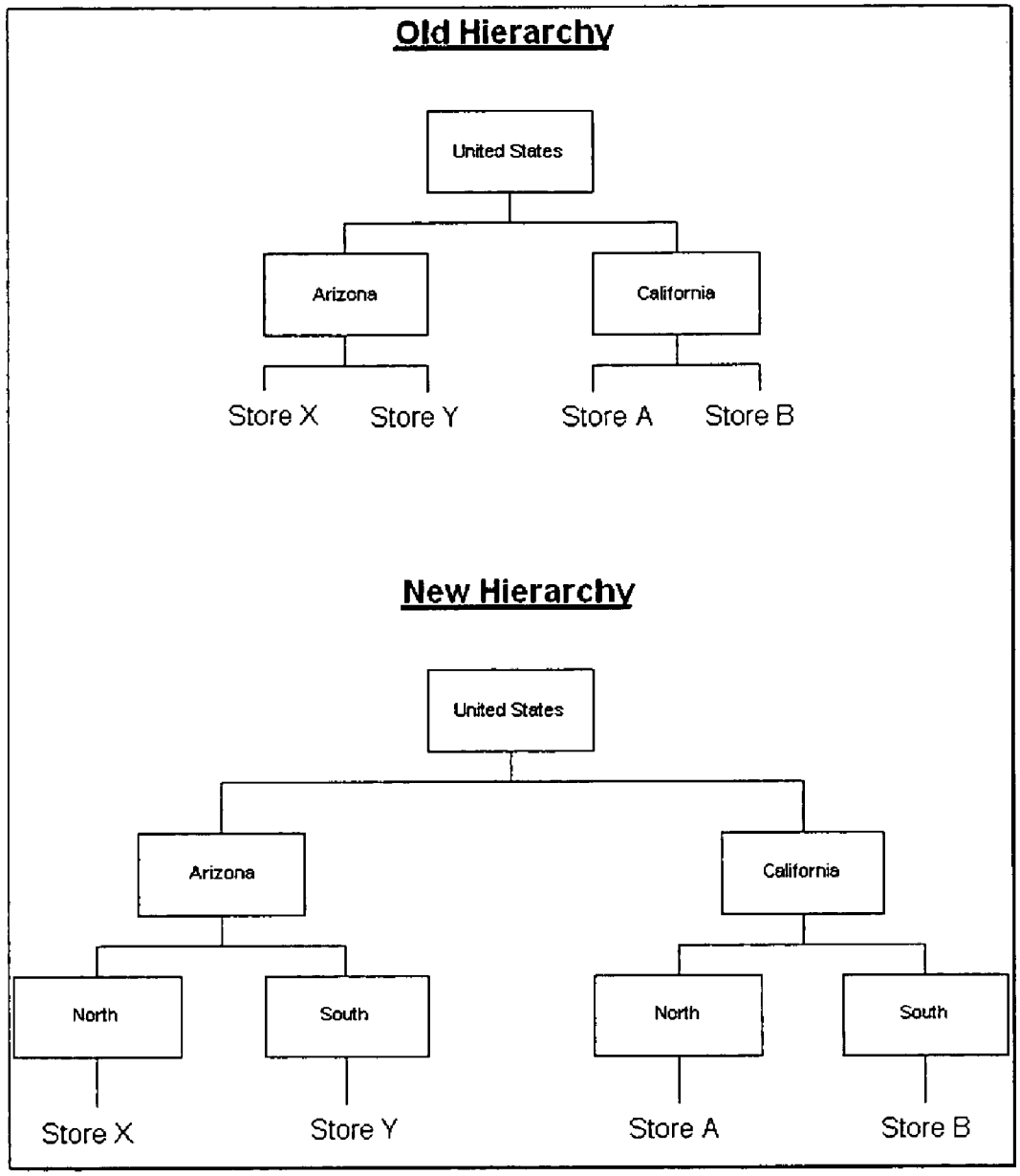
Figure 24 - New and Old hierarchies in MSM

REPORT WITH OLD HIERARCHY

MSR CALL SUMMARY REPORT

UNITED STATES-> California
| Location | Total Calls | Incoming Calls | Outgoing Calls | ... |
|---|---|---|---|---|
| Store A | 58 | 43 | 15 | |
| Store B | 105 | 30 | 75 | |

UNITED STATES-> Arizona
| Location | Total Calls | Incoming Calls | Outgoing Calls | ... |
|---|---|---|---|---|
| Store X | 96 | 40 | 56 | |
| Store Y | 150 | 80 | 70 | |

REPORT WITH NEW HIERARCHY

MSR CALL SUMMARY REPORT

UNITED STATES-> California->North
| Location | Total Calls | Incoming Calls | Outgoing Calls | ... |
|---|---|---|---|---|
| Store A | 58 | 43 | 15 | |

UNITED STATES-> California->South
| Location | Total Calls | Incoming Calls | Outgoing Calls | ... |
|---|---|---|---|---|
| Store B | 105 | 30 | 75 | |

UNITED STATES-> Arizona->North
| Location | Total Calls | Incoming Calls | Outgoing Calls | ... |
|---|---|---|---|---|
| Store X | 96 | 40 | 56 | |

UNITED STATES-> Arizona->South
| Location | Total Calls | Incoming Calls | Outgoing Calls | ... |
|---|---|---|---|---|
| Store Y | 150 | 80 | 70 | |

Figure 25 - Example of how Hierarchy is propagated to reporting system

| TableName | UpdateFlag |
|---|---|
| Group | 0 |
| GroupMember | 1 |
| Location | 0 |

Figure 26 - UPdatedTables table

| Location Key | Location ID | Status | Equipment Serial# |
|---|---|---|---|
| 1 | Store A | Open | IO5001 |
| 2 | Store B | Open | IO5002 |
| 3 | Store X | Closed | |
| 4 | Store Y | Open | IO5004 |

Figure 27 - Location Table defines the set of valid locations and assigns unique location keys

| GroupID | Name |
|---|---|
| 1 | United States |
| 2 | Arizona |
| 3 | California |
| 4 | North (Arizona) |
| 5 | South (Arizona) |
| 6 | North (California) |
| 7 | South (California) |

Figure 28 - Group Table defines the set of valid groups and assigns unique group IDs

| GroupID | Type | GroupMember | LocationMember |
|---|---|---|---|
| 1 | Group | 2 (Arizona) | |
| 1 | Group | 3 (California) | |
| 2 | Group | 4 (North Arizona) | |
| 2 | Group | 5 (South Arizona) | |
| 3 | Group | 6 (North California) | |
| 3 | Group | 7 (South California) | |
| 4 | Location | | 3 (Store X) |
| 5 | Location | | 4 (Store Y) |
| 6 | Location | | 1 (Store A) |
| 7 | Location | | 2 (Store B) |

Figure 29 - Group Member table describes the hierarchy

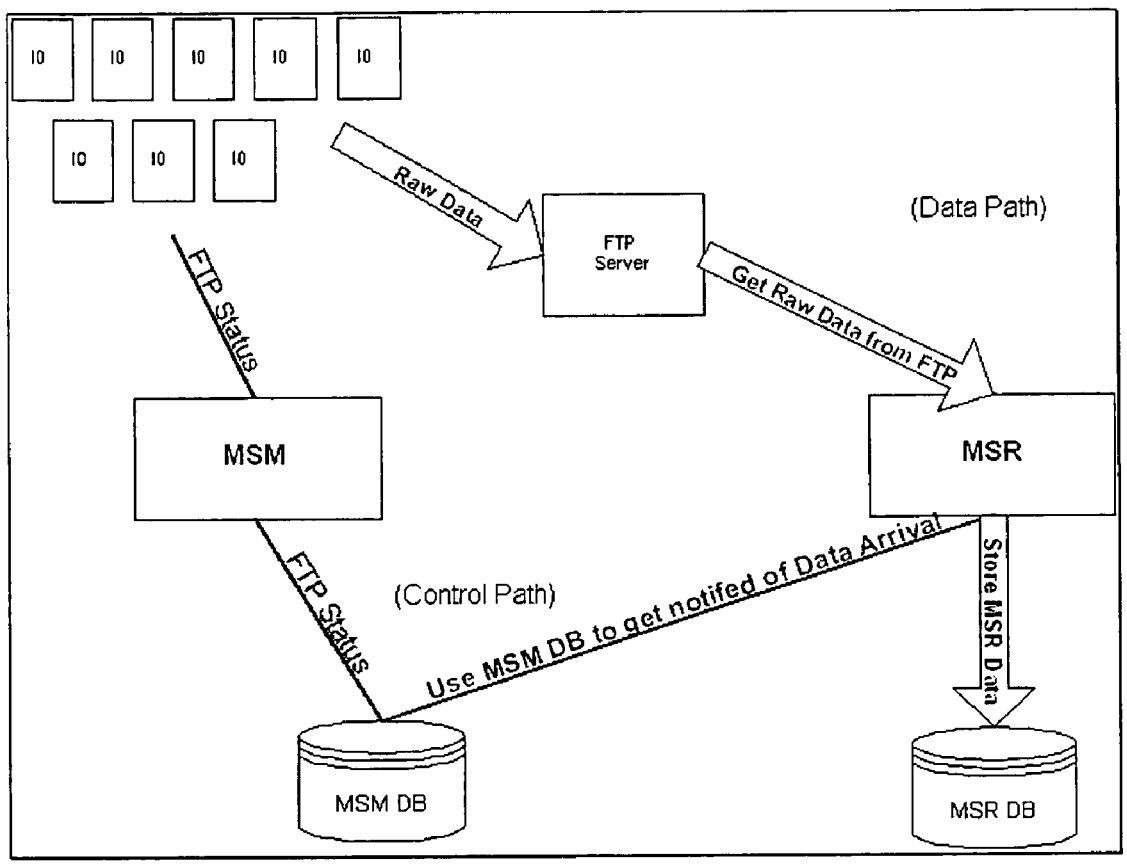
Figure 30 - MSM/MSR handshaking mechanism

METHODS FOR PROVIDING A REPORT DATABASE FOR A PLURALITY OF LOCALIZED DEVICES USING AN ABSTRACTION LAYER AND ATOMIC ERROR HANDLING

This application is a continuation-in-part of co-pending application Ser. No. 10/324,592 filed on Dec. 19, 2002.

FIELD OF THE INVENTION

The present invention relates to distributed computer server systems in general, and more particularly, to the management of multiple related communications systems and in particular to improved reporting capabilities for such multiple related communications systems. As an example, converged communications systems integrate voice and data communications services and applications, e.g., through the use of a packet bus and a time-division multiplexed (TDM) bus. The complexity, and associated management issues, of the converged communications services platform is heightened when multiple installations are to be managed in a coherent, unified manner, especially if from a centralized headquarters, e.g., multiple installations of systems that are to be logically combined as part of one organization. Certain and various aspects relating to atomic error handling, transaction-based authentication/security, intelligent bandwidth management, decoupled data/configuration messaging, improved scalability, auto-detection functions, business metrics, etc., are described. In addition to a converged communications system context, many aspects are contemplated to be advantageous in other applications where distributed computer server systems are inter-related, and accordingly require a coherent distributed management approach.

BACKGROUND OF THE INVENTION

Prior art approaches for managing software servers in such a multi-system network often involve centralized software distribution and data collection systems. As one example, the Tivoli software distribution system available from IBM is a product that, in the context of multisite management of communications systems, is a complicated architecture where a centralized distribution and collection system server, network infrastructure and gateway elements are required to interrelate the various components. The pathway between all of the devices is reliant upon a central distribution system server, shared switches/routers, etc., and accordingly there are single points of failure for the entire distribution system. In addition, prior art software distributions solutions require additional network and computer infrastructure, gateways and servers when additional nodes are added to the network. This requirement for increased infrastructure increase complexity, cost and has a significant impact on scalability of the network to be managed. In addition, prior art software distribution solutions are not instrumented to provide specific and real time fault management functions and remote administration functions for the variety of capabilities that exist on a converged voice and data platform. Furthermore, for an individual converged communications system to access a software update (e.g., a cab file), it must use the same shared bandwidth, infrastructure and centralized software services as all the other converged systems. Besides the undue expense of such a proprietary system (perhaps most especially for smaller installations), there is the associated complexity for configuring and maintaining such an approach. Because the same centralized distribution system is being used for multiple systems (e.g., plurality of converged communications systems 2), the management of the overall system is expensive and complicated and requires additional servers, boundary gateways and network infrastructure to scale and support additional converged solutions. It is not particularly efficient for the presently discussed converged architecture, where, for example, there are complex management issues of a distributed communications services platform. In addition most of the software distribution solutions are focused on distribution or pushing content from a central location to a number of servers and thus not well tuned for fault management, the collection of data, reports and server back-ups. As a final limitation, in a typical software distribution environment, the control mechanisms and data transport are tied together and vendor specific, not able to support alternative vendor transport methods and external server storage and hosting facilities. In order to get one feature of the system, the consumer must take the whole package, and consequently may not leverage pre-existing components that may not be part of the same proprietary system.

SUMMARY OF THE INVENTION

The present invention preferably involves improved systems and methods for multisite management of communications systems. A decentralized architecture is described, which addresses the aforementioned limitations of the prior art. A server is disclosed that preferably communicates with each of a plurality of converged communications systems, e.g., through the use of sockets. The server interfaces to a set of server and database functions required for the control mechanisms. An improved communication protocol is described that preferably is optimized for the presently described multisite management architecture. The control mechanisms implemented in a protocol between the central services and the converged platforms preferably are directed to configuration, update, upgrade, backup, and reporting functions. The actual traffic load, content, and transport of data is decentralized among the converged systems, as each one uses direct connections (e.g., file transfer protocol) to access update/configuration data as needed. Each communications platform has the networking infrastructure, protocols, services and intelligence to manage the connection to the content server thus eliminating the need for boundary gateways, caching servers and other network infrastructure required in current software distribution implementations. In addition to enabling efficient scaling of these functions, the present invention involves file servers that can be hosted externally, located locally, or maintained at the central headquarters. Additionally, as they are preferably non-proprietary, such servers can alternatively be under the management and control of alternative and/or third party facilities. An improved set of graphical user interface (GUI) features are described that improve the efficiency of the management of multiple systems.

Additionally, as part of the system management, improved reporting functions preferably are implemented to, for example, gather business metrics from the converged communications systems. Such business metrics may include [INCLUDE LIST]. Preferably, an abstraction layer is utilized in connection with applications such as those providing improved reporting functions to more desirably manage business entities, referred to as "locations", such as branch offices or stores, rather than physical equipment (e.g., Integrated Communication Platforms, servers, customer premise equipment, etc.). Through the use of one or more abstraction layers, hierarchies for reporting of business metric data or the like may be developed so that multiple distributed systems may be more desirably managed in a more "business centric" manner as compared to reporting, etc., based on physical equipment.

BRIEF DESCRIPTION OF THE DRAWINGS

The above objects and other advantages of the present invention will become more apparent by describing in detail the preferred embodiments of the present invention with reference to the attached drawings in which:

FIGS. 11-14 illustrate exemplary preferred embodiments of a communication protocol between multiple devices in a communications system, utilized in accordance with certain embodiments of the present invention;

FIG. 16 illustrates exemplary preferred embodiments of a communication protocol between multiple devices in a communications system, utilized in accordance with certain embodiments of the present invention;

FIG. 17 illustrates an exemplary prior art communication protocol;

FIG. 18 illustrates exemplary preferred embodiments of a communication protocol between multiple devices in a communications system, utilized in accordance with certain embodiments of the present invention;

FIGS. 20-30 illustrate additional aspects of certain preferred embodiments of improved reporting capabilities in accordance with the present invention.

DETAILED DESCRIPTION OF EXEMPLARY PREFERRED EMBODIMENTS

The present invention will be described in greater detail with reference to certain preferred and certain other embodiments, which may serve to further the understanding of preferred embodiments of the present invention. As described elsewhere herein, various refinements and substitutions of the various elements of the various embodiments are possible based on the principles and teachings herein.

Figure 1:
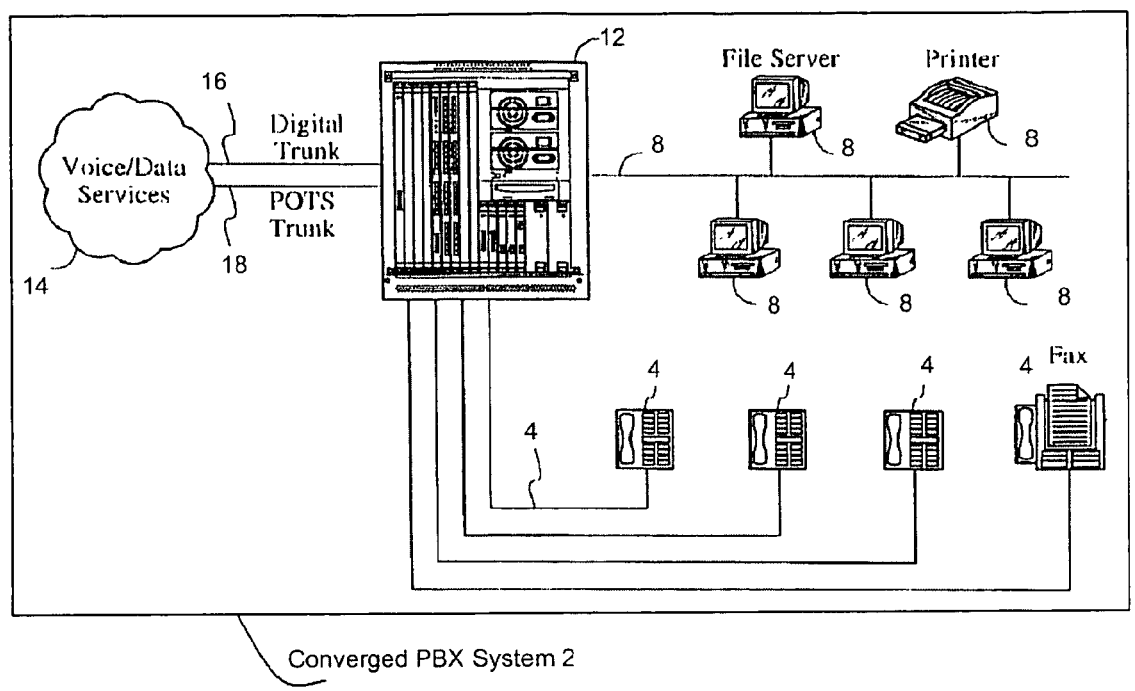
FIG. 1 illustrates an exemplary converged communications system, utilized in accordance with certain embodiments of the present invention.

Converged communications systems can be configured as shown in FIG. 1, where a converged public branch exchange (PBX) system 2 is shown and which may include traditional voice systems 4 and traditional data systems 8. Such a system can incorporate a converged telephony hardware 12 arranged in connection with voice/data services 14 via, for example, digital trunk 16 and POTS trunk 18. Certain examples of such a system preferably involve a TDM bus and a packet bus, as well as some intelligent switching there between, as well as certain protocols, services, and applications. Converged communications systems can be considered as systems that incorporate both the traditional voice/TDM/POTS architecture and the traditional data/packet/digital architecture into an interrelated architecture that leverages the two worlds to provide additional benefits.

The present disclosure involves certain and various preferred embodiments of a converged communications system. Certain previously filed disclosures involve further details and examples about various embodiments that provide a context for the present discussion. For example, U.S. Pat. Nos. 6,343,074, 6,298,045, 6,292,482, 6,289,025, 6,266,341, 6,266,340, 6,208,658, 6,181,694, and 6,154,465 involve such embodiments and accordingly are hereby incorporated by reference. However, as will be obvious to one of ordinary skill in this field, there are many embodiments described herein that are not limited to the context of a converged communications system. Clearly, many aspects of the present invention can be very advantageous in a number of other areas where distributed computer server systems are inter-related, and accordingly require a coherent distributed management approach. As one example, a globally distributed interconnected network for travel reservations would likely benefit from many of the embodiments discussed herein. As another example, a large corporate network would similarly likely benefit from many such embodiments. Certain and various aspects relating to atomic error handling, transaction-based authentication/security, intelligent bandwidth management, decoupled data/configuration messaging, improved scalability, auto-detection functions, business metrics, etc., would clearly be relevant in such architectures. For purposes of clarity, the present discussion will at times focus on a converged communications server context. However, it is intended that many of the present embodiments can be used to advantage in these other related areas, and such networks and uses are within the scope of the inventions disclosed herein. Accordingly, where the disclosure hereinafter references "converged communications system" or the like, in alternative embodiments terms such as "computing system," "distributed server system," "distributed application system," etc., may be used in lieu thereof.

In certain implementations where multiple converged communications systems are necessary, e.g., due to multiple geographic locations, and/or the sheer number of users, it is necessary to use multiple converged communications systems in association with each other. As an example, a large company with a geographically diverse distribution of offices that wants to have a unified voice/data system might configure a plurality of converged PBX systems to work together, e.g., leveraging the same dialing plan and data network services. Such an arrangement allows one employee directory across multiple locations, and allows the various offices to communicate with one another as if they were in the same office. In this example, it is necessary for each of the multiple systems to be coordinated in terms of data functions such as subscriber directory synchronization, operating system updates, feature upgrades, fixes and/or updates, new network service levels, etc. The benefits of the converged architecture shown in FIG.

1 can be obtained in a multi-system environment if the multiple systems are managed together.

Figure 2:
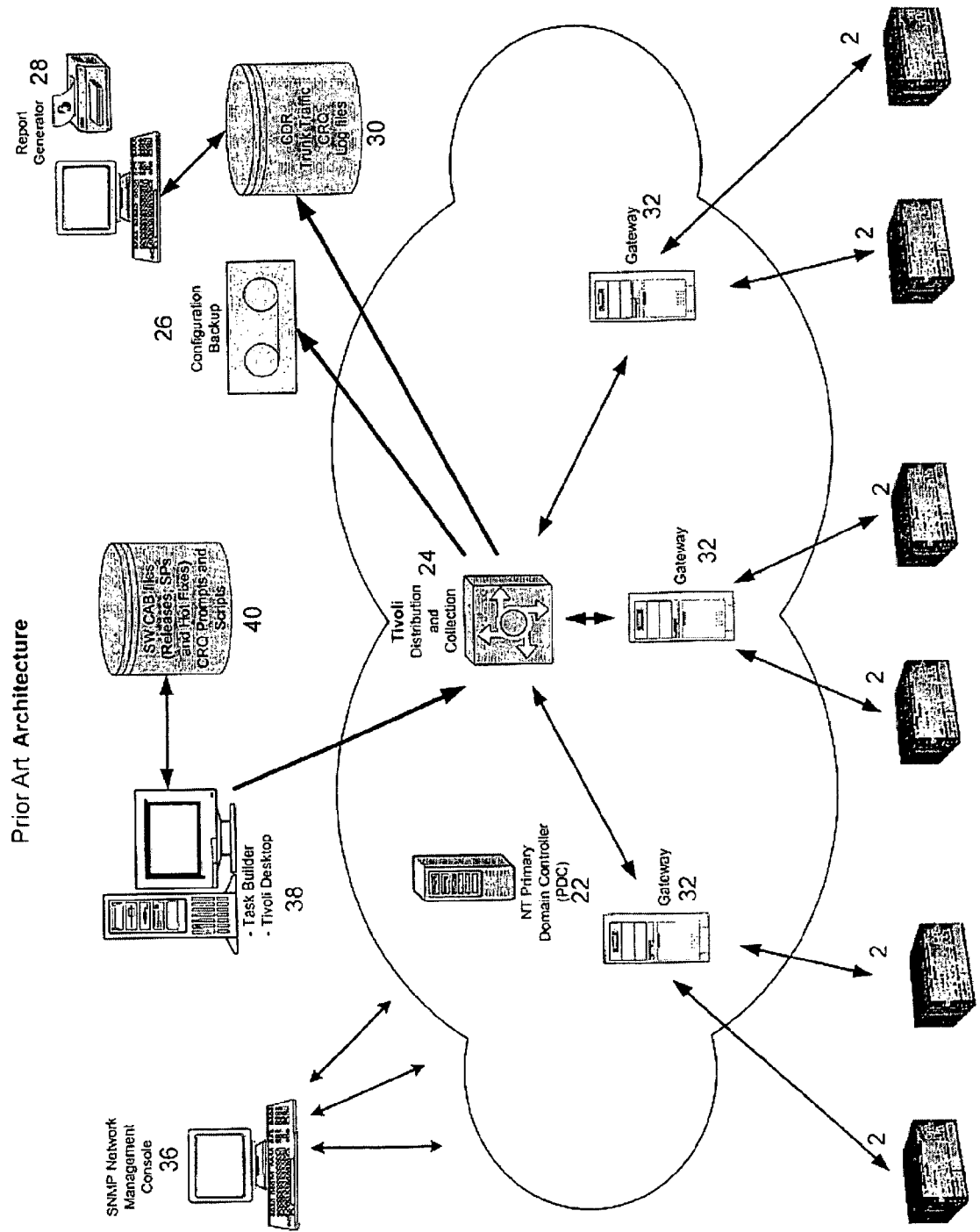
FIG. 2 illustrates an exemplary prior art architecture for multisite management of a plurality of converged communications systems.

One prior art approach for managing such a multi-system approach of the previous examples is shown in FIG. 2, where a plurality of converged communications systems 2 are shown in association with a domain controller 22 and distribution system 24. In this particular figure, the example architecture of the distribution system is the Tivoli software distribution system available from IBM. Associated with the distribution system 24 is a configuration backup 26, a report generator 28, and a CDR trunk traffic CRQ 30. In addition, a plurality of gateways 32 are shown interposed between the distribution system 24 and the plurality of converged communications systems 2. Associated with these items is an SNMP management console 36, a task builder 38, and an associated cab storage 40.

The example of FIG. 2 depicts a complicated architecture, where a centralized distribution and collection system 24 is required to interrelate the various components. The pathway between all of the devices goes through distribution system 24, and accordingly there is a single point of failure for the entire distribution system. Additionally, for an individual converged system 2 to access a software update cab file, it must use the same shared bandwidth as all the other converged systems. Besides the undue expense of such a system (especially for smaller installations), there is the associated complexity for configuring and maintaining such an approach. Because the same system 24 is being used for many different things (e.g., software updates, trunk traffic databases, CRQ log files, configuration, scripts, etc.), and for multiple systems (e.g., plurality of converged communications systems 2), the management of system 24 is expensive and complicated. It is not particularly efficient for the present converged architecture, e.g., where several distributed data collection functions are inter-operable.

Figure 3:
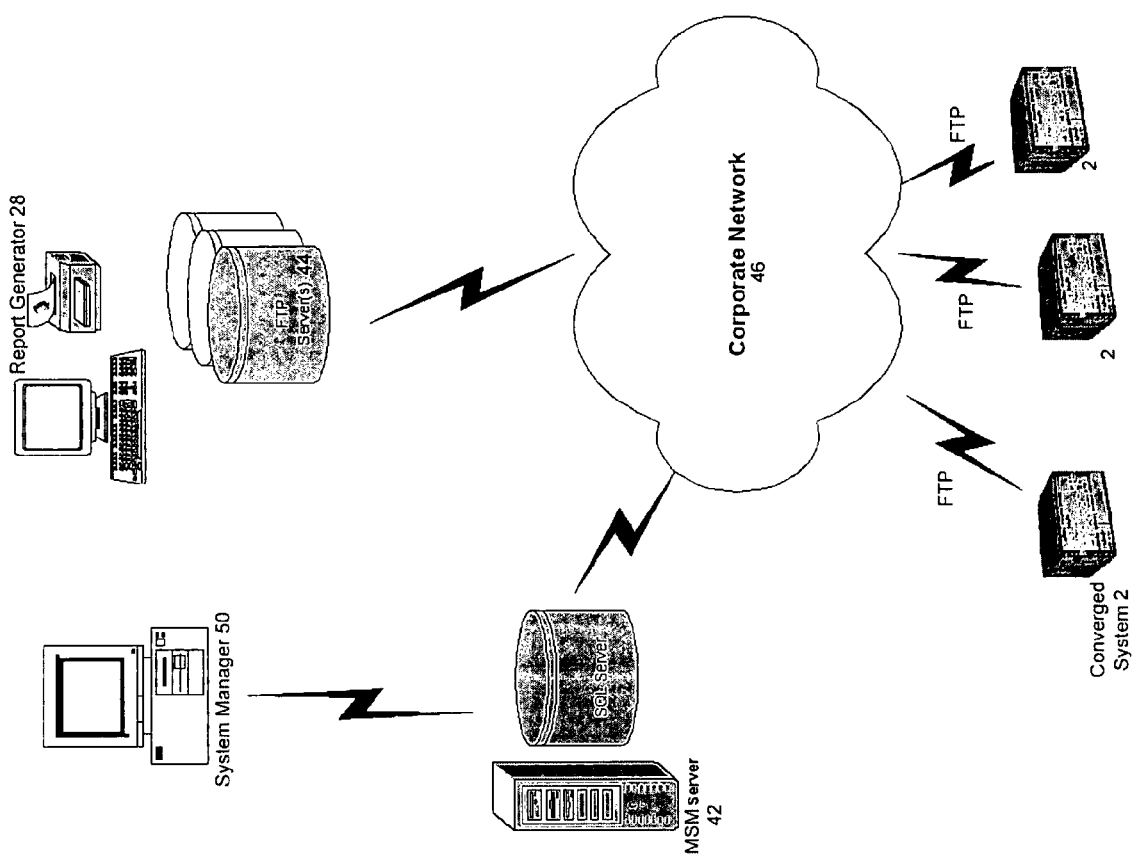
FIG. 3 illustrates exemplary preferred embodiments of a hardware architecture for multisite management of a plurality of converged communications systems, utilized in accordance with certain embodiments of the present invention.

FIG. 3 depicts a multisite management architecture in accordance with preferred embodiments of the present invention. As shown, a plurality of converged communications systems 2 preferably communicate with an MSM Server 42. As one example, queued sockets can be used for this communication. Clearly, while these server locations may be separate server hardware systems, they can alternatively be located on a common hardware system, or each redundantly co-located on multiple hardware systems at a variety of different locations, including on and/or off premises. Additionally, each communications system 2 preferably is able to directly access, e.g., via specific primitives in the File Transport Protocol, server locations residing on FTP server(s) 44. The enhancements to the standard use of FTP preferably involves foregoing MGET and MPUT commands in favor of actual byte-sized reads and writes. The use of such an approach preferably enables intelligent bandwidth management, as the amount of bandwidth allocated for software distribution can be carefully limited. Although standard FTP can certainly be used with certain embodiments of the present invention, the use of such an enhanced FTP, e.g., with byte-sized read and writes, will enable more intelligent use of available bandwidth.

Figure 19:
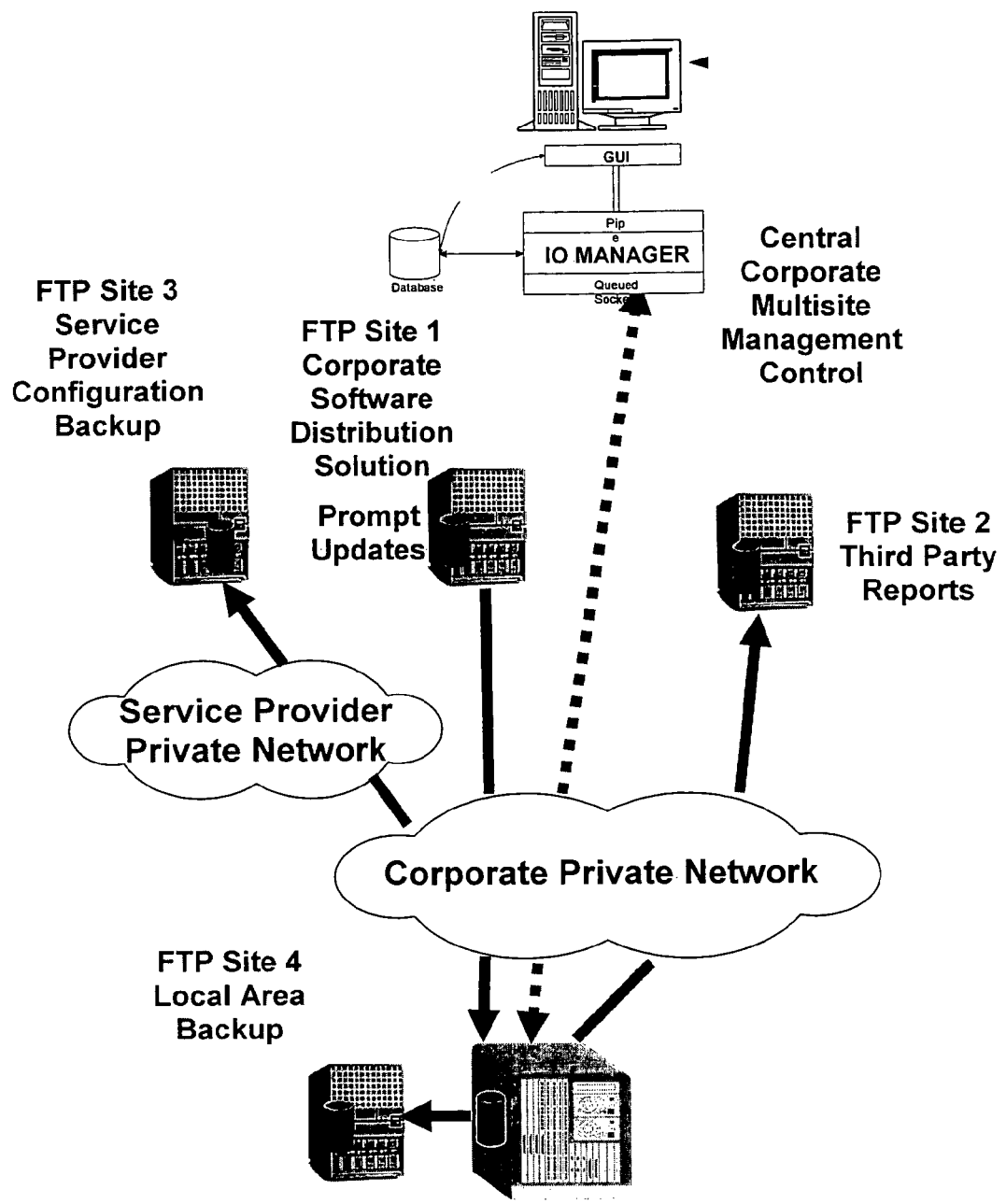
FIG. 19 illustrates exemplary preferred embodiments of a distributed FTP Server architecture, utilized in accordance with certain embodiments of the present invention.

Associated with the exemplary embodiments illustrated in FIG. 3 are certain exemplary software components that may preferably be used advantageously. System manager 50 (shown in FIG. 3) preferably is a graphical user interface-based client application used preferably to configure and schedule change events or report retrieval across a network of converged systems and a back-end SQL (structured query language) server component preferably containing the database of converged systems under management, and the associated changes to these systems. While system manager 50 can preferably be located anywhere within the network, it is associated with the configuration of MSM Server 42. System agent 52 preferably is an intelligent proxy that resides on each converged system under management. The System Agent preferably receives a change request from the System Manager, acknowledges receipt, execute the requested change and reports on the success or failure of the scheduled event. Keeping track of the status of management events and activities, including logging, tracing, and real-time event notification, preferably is also handled by the System Agent. The System Agent preferably sends various types of statistics and reports from the converged system to a pre-determined location. Management protocol 54 preferably supports the sending and receiving of messages from system manager 50 to system agent 52 residing on each converged system under management. Transport protocol 56 preferably is an enhanced version of FTP (e.g., as discussed above) data transport and preferably can be used for transport of files between FTP server locations and each converged system 2 under management. FTP server 44 (shown in FIG. 3) is preferably a standard FTP server component for storing data files. While FIG. 3 shows FTP servers located remotely and shared with multiple communications systems, those servers can be located in the same premise as the communications system and not shared with all other systems in the network. In addition, some functions could have FTP servers located remotely, like reporting, while other functions can be local and connect via a high speed LAN, like backup files. As an example, FIG. 19 depicts a topology where FTP service preferably can be located in different physical locations depending on the usage requirements of the management services desired. Service provider configurations, third party reporting applications, centralized enterprise software servers and local servers preferably can all have FTP directories where content and software for multiple sites are stored and managed.

As shown in FIG. 3, the present example streamlines the process of managing multiple communications systems by shifting much of the intelligence, and data transport burden, to the systems themselves. This arrangement leverages the existing hardware more fully and decentralizes the single points of failure and the undue complexity of the prior art approach shown in FIG. 2. This solution also preferably enables a more seamless scalability, with the network infrastructure, intelligent monitoring and data transport required for a given communication system preferably integrated into the system itself. Preferably, each converged communications system 2 will be controlled by MSM server 42, which is preferably a server that is responsible for sending requests to, and receiving status messages from, each of the plurality of converged systems 2. The request and status messages are preferably passed via sockets, and a queuing mechanism preferably is implemented to guarantee delivery of messages even if network problems occur. Control is then made more efficient, preferably focused on specific actions only (e.g., authentication can be action-dependent) and preferably completely decoupled from data movement (e.g., adding to the scaling efficiency).

System manager 50 preferably manages the various tasks being performed by multiple system agents 52. In certain embodiments, it is preferable to use heartbeat messages sent from each system agent 52 for reception by system manager 50. Such heartbeat messages can be sent periodically, e.g., once a day, and once each time the system agent 52 is booted up. Preferably, heartbeat messages contain a list of tasks that the originating system agent 52 is currently executing (and/or plans to execute). If the list of tasks sent to the system manager 50 does not match the list of expected tasks that the system manager maintains for the particular system agent 52, then the system manager 50 preferably sends a 'sync' message to the particular system agent 52 that contains the list of tasks that the system agent 52 should be performing (and/or planning to perform). Preferably, along with the sync message, all pertinent task data will be sent to the system agent 52. Upon receiving this information, system agent 52 preferably will add all tasks to its schedule that were not previously scheduled, and remove all tasks from its schedule that are not contained in the sync message.

Figure 4:
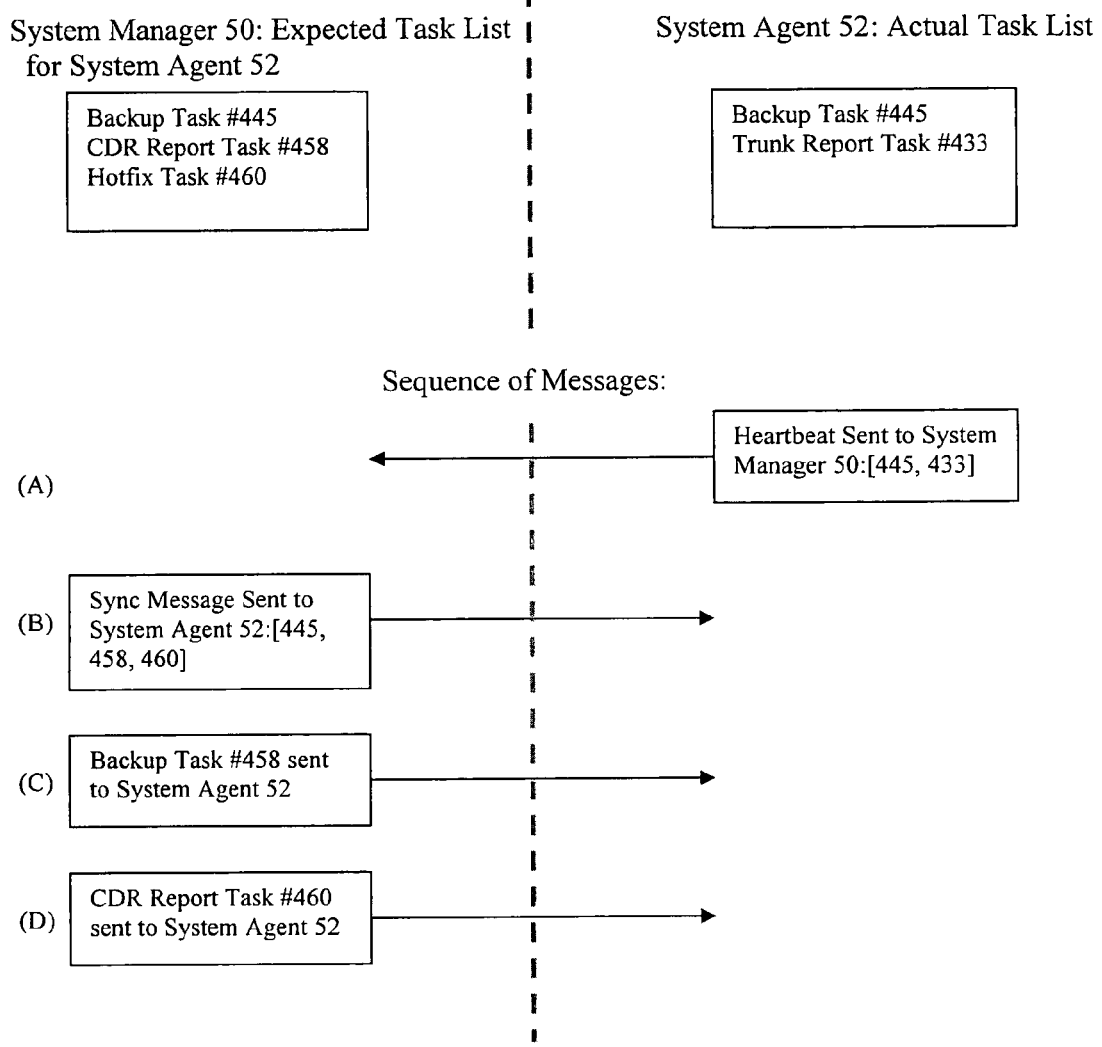
FIG. 4 illustrates exemplary preferred embodiments of a messaging sequence for multisite management of a plurality of converged communications systems, utilized in accordance with certain embodiments of the present invention.

As an example, FIG. 4 illustrates expected tasks, actual tasks, and associated messages for resolving the two. System manager 50 has a list of expected tasks associated with a particular system agent 52: backup task #445, CDR report task #458, and hotfix task #460. System agent 52 has an actual task list that is different, with backup task #445 and trunk report task #433. To resolve this difference, system manager 50 preferably identifies the differences and responds appropriately to correct the list of scheduled tasks in system agent 52. As mentioned above, it is advantageous to use a heartbeat message at regular intervals and/or regular events, to provide system manager 50 with status information. In FIG. 4, at time (A) the particular system agent 52 sends such a heartbeat message to the system manager 50 containing the list of actual task (tasks 445 & 433). System manager 50 preferably compares the task list in the heartbeat message with an expected task list (tasks 445, 458, & 460). At time (B), system manager 50 preferably sends a sync message to system agent with the expected task list. This preferably is accompanied by additional messages containing tasks that were not on the actual task list in the heartbeat message (tasks 458 & 460). Preferably, at this point in the example, system agent 52 will remove task 433 from its schedule and add tasks 458 & 460. In this manner each system agent 52 can synchronize with system manager 50.

Following this example, requests preferably will typically require the movement of files (e.g., upgrade CABs, voice prompts, CRD reports, configuration backups etc.) and each converged system 2 preferably will then use primitive API calls within the standard FTP to carry out the transport functions requested. For example, if an individual converged system 2 receives a request to upgrade to a service pack, it preferably will receive enough information in that request to validate and then execute. As an example, this preferably would involve invoking a transport session with an FTP server, finding and retrieving the correct CAB file, and running the upgrade process. Additionally, MSM server 42 may send a request to all targeted converged systems 2 to run certain reports; such a request preferably will indicate how often reports should be produced and optionally timing/scheduling parameters by which the individual converged systems should carry out the report function, and which FTP server 44 to log into to deposit the report data. In a similar example, the MSM server 42 may send a backup request to all targeted converged systems 2, preferably indicating how often backups should occur and optionally timing/scheduling parameters by which the individual converged systems should carry out the backup function, as well as enough information for each converged system 2 to log into a designated FTP server 44 and deposit the backup files in the proper directory. Preferably, all the while in each of these examples, the system agent 52, located on a particular converged system 2, is logging and sending status messages to the MSM server 42, that preferably can be accessed/viewed via system manager 50, informing it about the progress of the request. Accordingly, MSM server 42 preferably will track the progress of each request for every converged system 2. Additionally, as mentioned above, it is preferable to implement an enhanced, e.g., byte level, usage of the FTP protocol, whereby features such as intelligent bandwidth management are afforded.

Certain embodiments of the present invention preferably enable auto-registration of each converged system 2 with MSM server 42. As one example, system agent 52 preferably automatically registers with system manager 50. Specific information relating to configuration, identity, and bandwidth constraints preferably is received by system manager 50 when each converged system 2 is connected to the network. Following this example, the detection of an additional converged system 2 that is connected to the network preferably will populate a database associated with system manager 50 with information such as application versioning and configuration.

Additionally, certain embodiments of the present invention preferably enable one-time tasks as well as reoccurring tasks. As examples, a one time project may be associated with an network wide update, while a recurring task such as toll fraud monitoring may be arranged to be performed daily or other predetermined schedule.

Certain embodiments of the present invention preferably allow business metrics to be monitored. As examples, statistics such as average hold time, number of dropped calls, number of failed transfers, trunk utilization ratios, number of busy signals, staff utilization rates, etc., preferably can be collected from multiple systems by system manager 50. Additionally, other examples involve marketing feedback: a company may put an ad in one geographic region and monitor the call patterns in that area to assess the response to the ad. As another example, a company may change the prompting to be customized for a local ad campaign to support prompting features that are interrelated to local ad strategies. As these examples illustrate, the present decentralized architecture with preferably decoupled data/configuration messaging enables efficient monitoring and reporting of call statistics, preferably accessible from any station on a network, preferably with transaction-based authentication.

FIG. 3 further depicts corporate network 46, which, in accordance with certain preferred embodiments, preferably allows centralized authentication, e.g., for remote management login procedures for voice and data equipment using standard NT domain controllers for centralized authentication. This approach leverages a persistent WAN connection and preferably can support multiple forms of authentication (e.g., user name/password, web standards, etc.) using a single logon service. Further, this approach allows the use of standard, relatively inexpensive, and easily manageable systems for authentication.

Certain of the preferred embodiments discussed herein are described in the context of a network of converged communications systems. However, as will be clear to one of ordinary skill in this field, many of the presently discussed embodiments are not limited to such an architecture. For example, the following discussion regarding an approach to message authentication and general management protocol features can be relevant to other types of architectures and systems where a network exists that would benefit from a management protocol and authentication functions. Accordingly, though the discussion below is directed to the context of a converged communications system, e.g., systems for providing data and telephony services in a networked environment, many embodiments are applicable to other network topologies and architectures.

Figure 5:
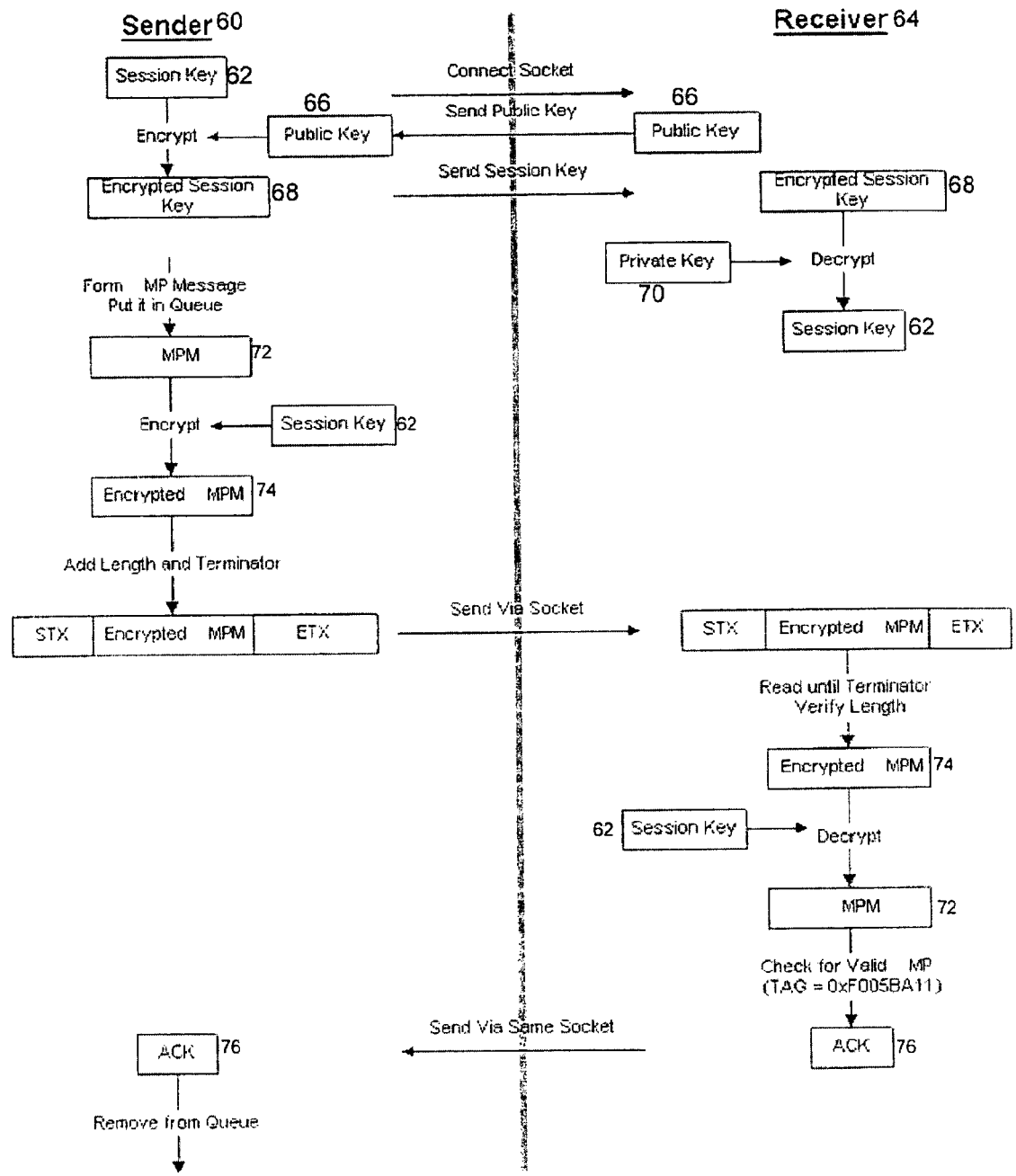
FIG. 5 illustrates exemplary preferred embodiments of an encrypted configuration communication path between multiple devices in a communications system, utilized in accordance with certain embodiments of the present invention.

FIG. 5 depicts an exemplary flowchart for one preferred way to protect the integrity of multi site management messages as they are carried out. As shown, sender 60 preferably encrypts a session key 62 using receiver 64's public key. The encrypted session key 68 resulting therefrom preferably is sent to the receiver 64, where it is preferably decrypted with receiver 64's private key 70. In this manner both the sender and receiver have the session key 62. Each transaction preferably has an independent authentication facility, allowing different persons to have limited and controlled access during designated periods to conduct network wide management functions. Accordingly, using such transaction-based security, it is preferably possible to only allow certain administrative users to do only certain things at only certain times. Not every person that has some system administrator type of role to perform needs to have network-wide system administrator access. This approach preferably can provide a system where the access rights of a particular administrative user are more closely paired to the actual requirements of that user's administrative tasks (i.e., access rights correspond to particular administrative tasks). As an example, such an efficiency becomes increasingly useful in more complex networks where multiple different systems are managed by multiple different departments, etc. It is contemplated that these features can be used advantageously in many contexts, e.g., a globally distributed interconnected network for travel reservations, and/or a large corporate network, as particular examples.

Continuing the example illustrated in FIG. 5, sender 60 forms a management protocol message (MPM) 72 and preferably puts it into a queue (e.g., for data delivery in times of network problems, etc.). At this point, sender 60 preferably encrypts MPM 72 using session key 62 to generate encrypted MPM 74. Preferably, sender 60 adds length prefix STX and terminator suffix ETX and sends via socket to receiver 64, whereby it preferably is read and verified by receiver 64. Receiver 64 preferably applies session key 62 to encrypted MPM 74 to decrypt MPM 72, and the message preferably is checked for validity.

In this example, assuming that there are no errors detected, acknowledgement message 76 preferably is sent via the same socket back to sender 60. Upon receipt of acknowledgement message 76, sender 60 preferably removes MPM 72 from its queue.

In this fashion, all management protocol messages preferably can be sent between the various systems in a protected and encrypted manner. Additionally, the messages preferably will be delivered even in times of network problems, as the safe delivery of each message preferably is acknowledged.

Figure 6:
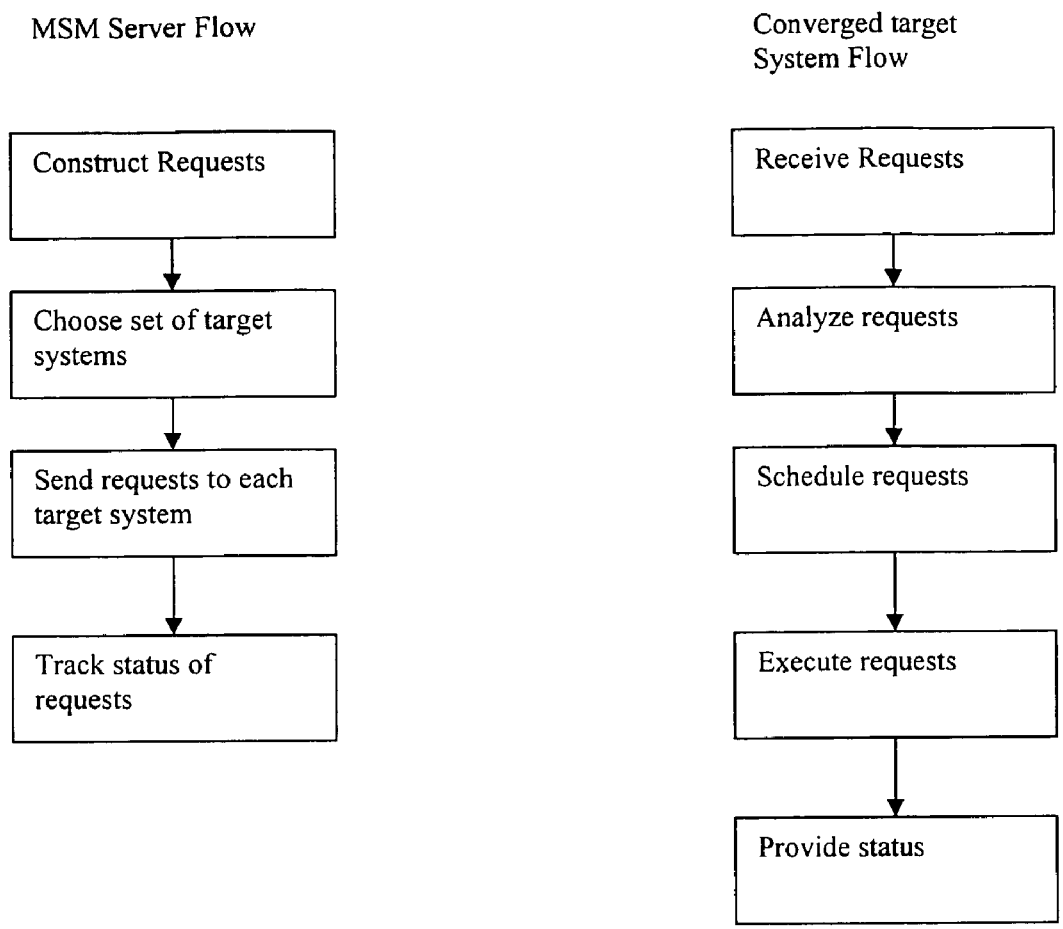
FIG. 6 illustrates exemplary preferred embodiments of the functional behavior of different devices in a communications system, utilized in accordance with certain embodiments of the present invention.

FIG. 6 illustrates an example of the flow of actions that both MSM server 42 (e.g., sender 60) and converged system 2 (e.g., receiver 64) preferably will enact in accordance with preferred embodiments of the present invention.

As shown on the MSM server side of FIG. 6, MSM server 42 preferably constructs requests, for example, by providing an interface (e.g., such as a 'GUI wizard') that allows the user to easily construct a request. Once a request is defined, the user preferably is able to select target systems to which the request applies. Preferably, the user interface allows the user to flexibly group the target systems, so that the user preferably will be able to apply requests to individual systems or to logical groups of systems.

Figure 7:
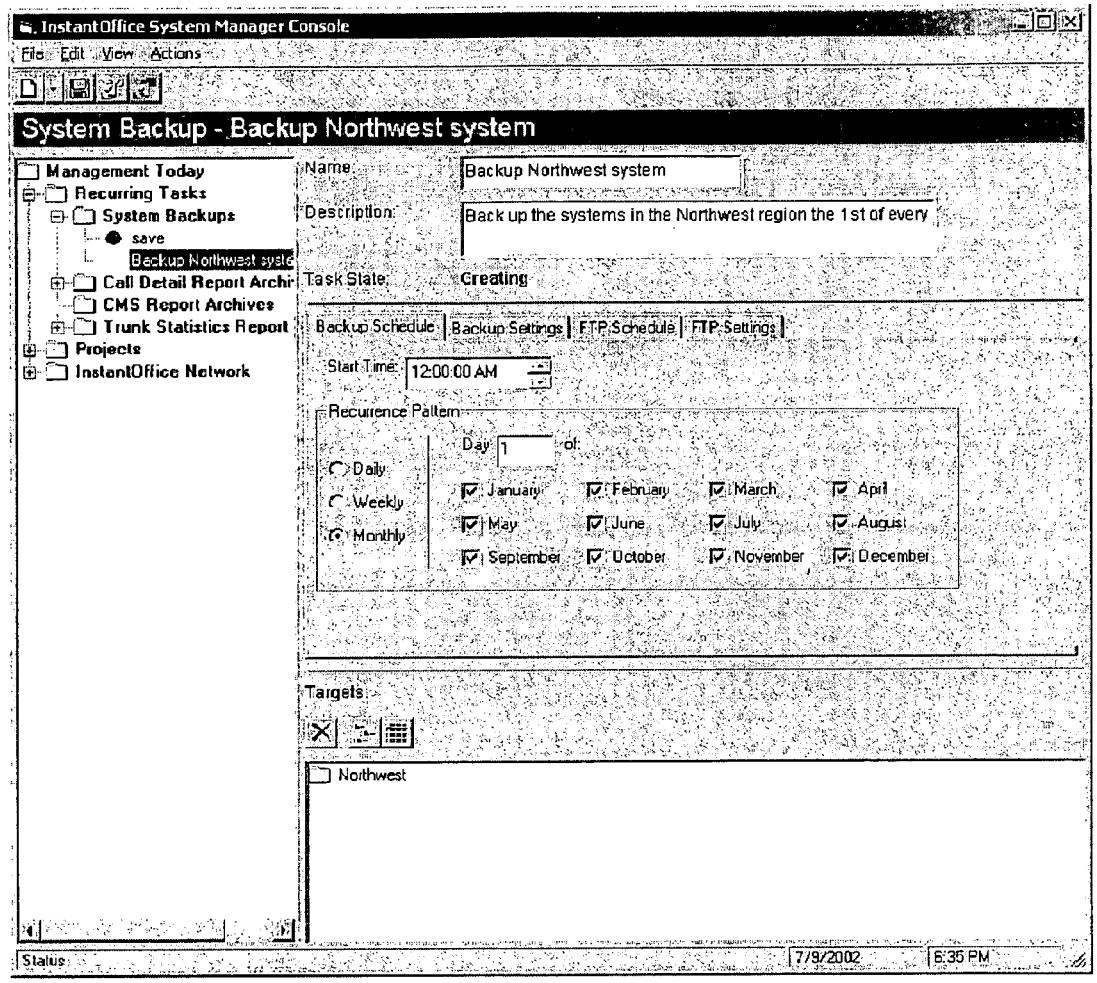
FIG. 7-10 illustrates exemplary preferred embodiments of a GUI interface for administrators, utilized in accordance with certain embodiments of the present invention.

FIG. 7 illustrates an example of a graphical user interface (GUI) suitable for creating recurring tasks. The example of FIG. 7 involves a backup task, and depicts a recurrence settings area as well as a start time indication and target area. This GUI preferably is part of system manager 50 application running on MSM Server 42. As mentioned earlier, system manager 50 preferably is accessible from anywhere on the network, via appropriate security safeguards. The example of FIG. 7 illustrates a task creation screen for use with recurring tasks that have not yet been submitted to individual converged systems 2 (shown in FIG. 3).

Figure 8:
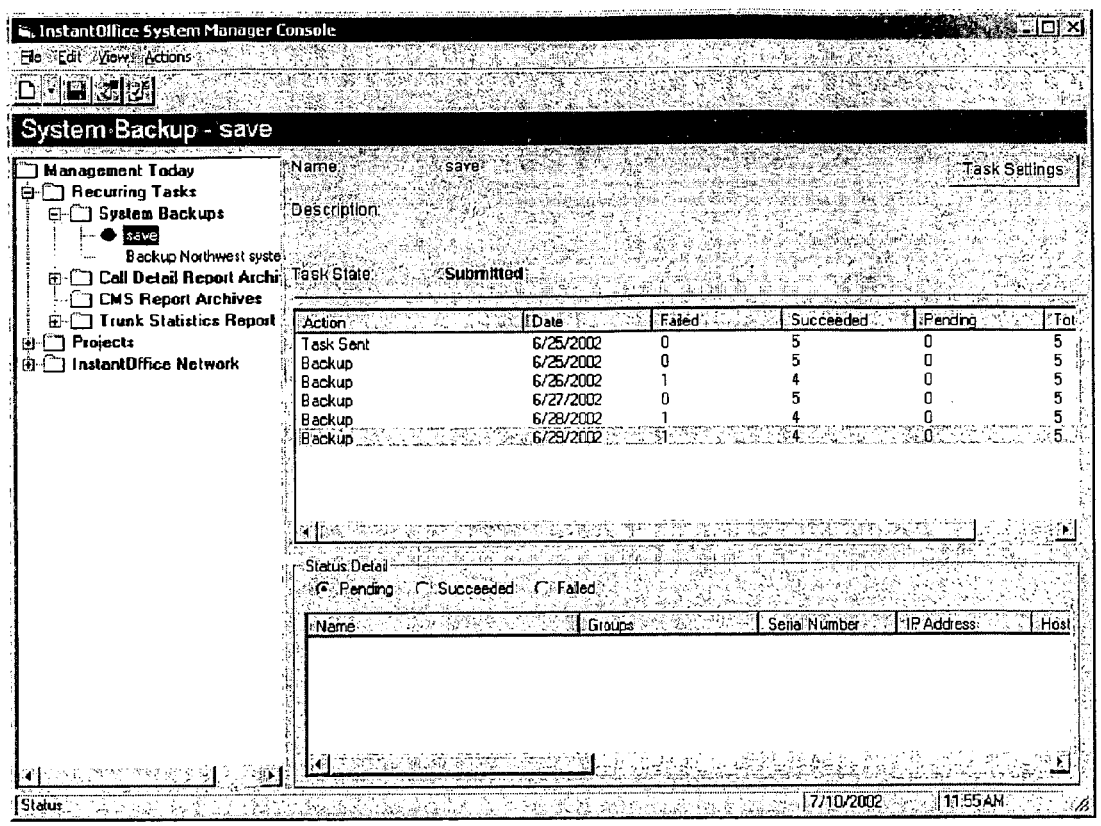

FIG. 8 continues the example of FIG. 7 and illustrates the recurring task in a submitted state. As shown, once a recurring task has been submitted (or cancelled), preferably the GUI view changes to display a list (at the top half of the view in FIG. 8) indicating each time the task occurs (e.g., as this example is a recurring task) and the summary status of the task. Preferably the user can select each occurrence f the recurring task and view the status details in the "Status Details" list (at the bottom half of the view in FIG. 8). Preferably this list displays, per occurrence, which systems are pending execution of the task, which have succeeded, and which have failed. Clearly, many of the GUI features illustrated in FIGS. 7 & 8 can be advantageously practiced in association with one-time tasks as well as recurring tasks.

Figure 9:
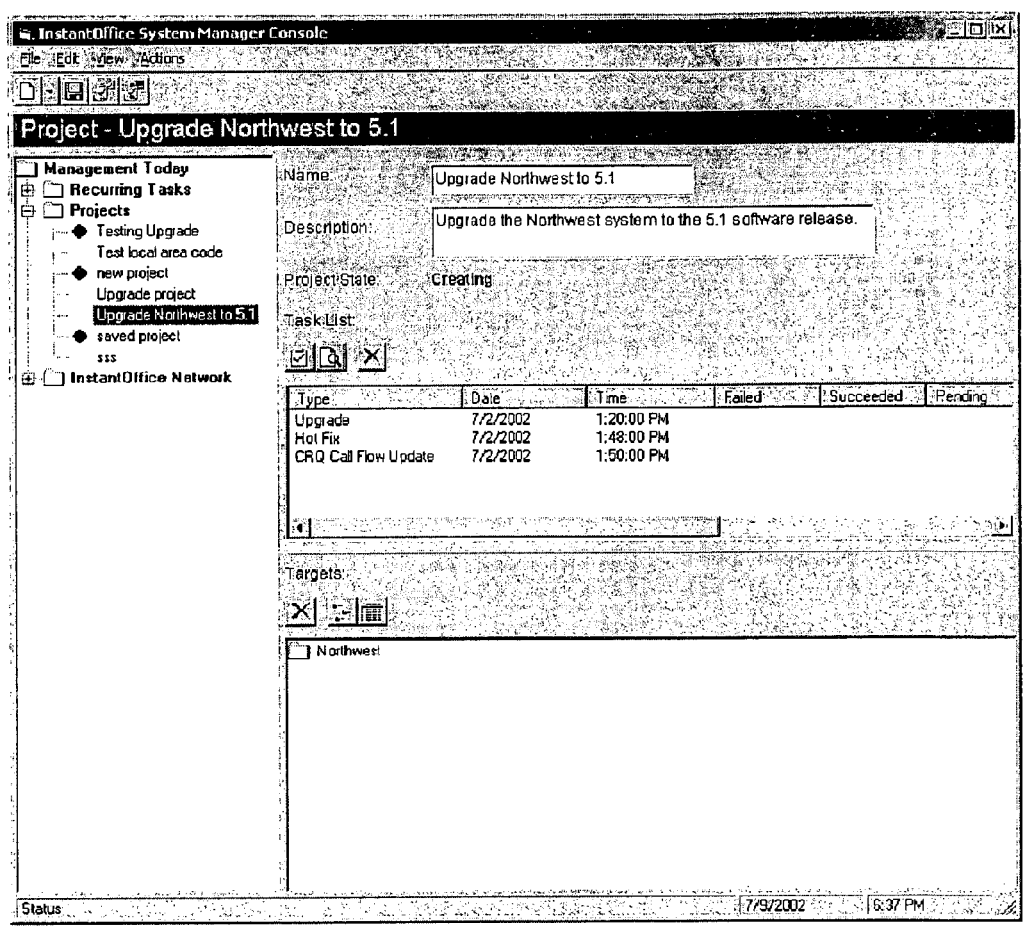

FIG. 9 depicts an exemplary GUI view associated with a project view. In this example, a project preferably may be considered as a set of related tasks, the execution of which may be interdependent (e.g., 'atomic' as discussed in more detail below, etc.). As shown in the right portion of FIG. 9, an exemplary project "Upgrade Northwest to 5.1" is shown consisting of 3 tasks: upgrade, hot fix, and CRQ call flow update. Preferably a user/administrator with appropriate security clearances may specify dependencies between tasks that are related. In this fashion, using the example of FIG. 9, the "hot fix" task (e.g., applying software patches, etc.) may be specified to only execute if the previous task (e.g., "upgrade") is completed successfully. On the left side of FIG. 9, preferably multiple projects can be accessible, along with other items such as recurring tasks and the plurality of converged systems 2 comprising parts of the network. In this example, the user/administrator preferably can view details of each item (e.g., each task shown in the right portion of FIG. 9) by double-clicking on the item. Furthermore, it may be advantageous to include (e.g., in a GUI project view such as depicted in FIG. 9) an accessible listing of the numbers/statistics associated with certain tasks, such as for any given day, the number of successes, failures, pending and total converged systems for any backup/report recurring tasks. In this manner, one desirable feature is the ability for a user/administrator to easily view relevant statistics associated with network management operations, preferably in an efficient manner. FIG. 18 illustrates characteristics of management tasks such as dates, times, status and details associated with specific tasks. Those characteristics preferably can be associated with a number of different multi-site management functions.

Figure 10:
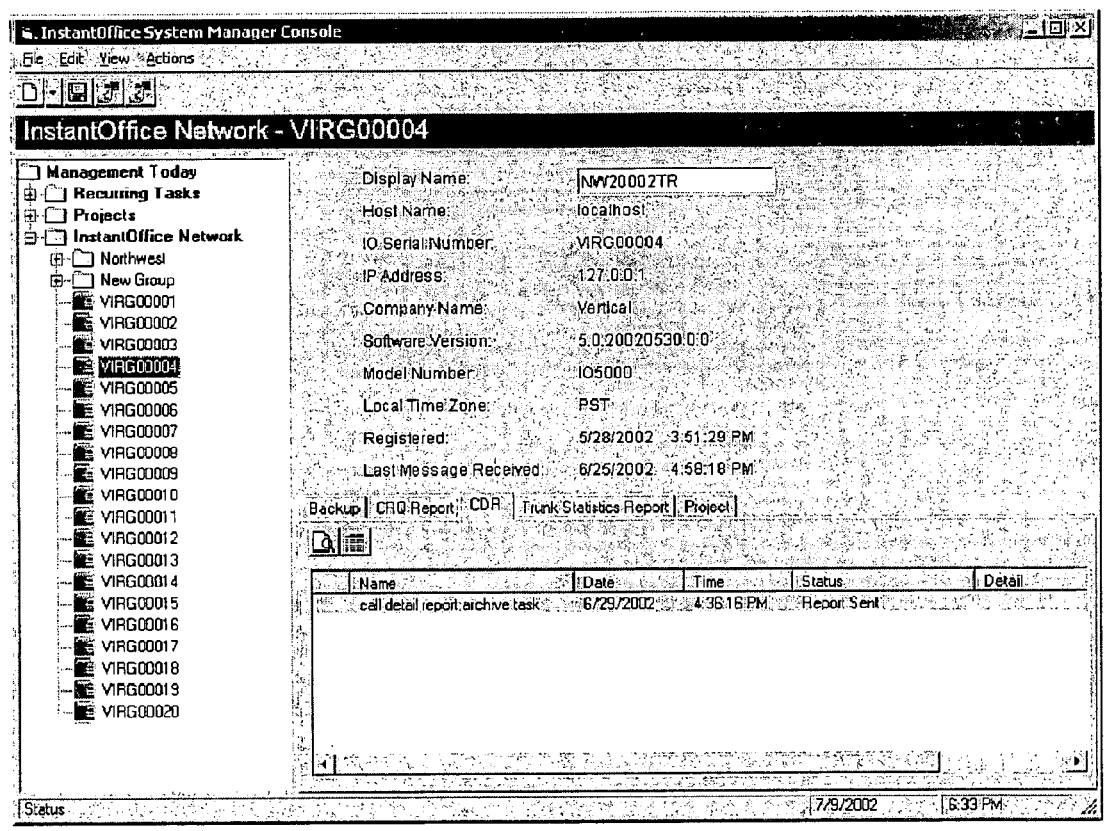

FIG. 10 continues the examples presented above and illustrates a preferable network view in more detail. As depicted on the left portion of FIG. 10, a plurality of individual converged systems 2 preferably are listed, individually, or in groupings (e.g., "Northwest", "New Group", etc.) As illustrated, the example of a particular converged system 2 is depicted as selected on the left (labeled "VIRG00004"), and associated status and detail information is depicted on the right (e.g., "display name", "host name", "serial number", "IP address", etc.). Continuing this example GUI view, the bottom portion of the right side of the view depicts tabs that may preferably be associated with certain tasks or task groups, thus providing quick access to the user/administrator to the task status and configuration information associated with each system on the network under management. Accordingly, the example view of FIG. 10 illustrates a desirable manner to allow administrators to quickly go from a network view of multiple systems (e.g., seeing reports of backup tasks, recurring tasks, success/failure statistics and characteristics, etc.) to an individual system view of a particular system (e.g., seeing all the status messages sent by a particular converged system 2 corresponding to a particular task, etc.). These features preferably allow administrators to easily pin-point problems in case of failure, etc.

Referring again to the example view of FIG. 10, the use of groupings (e.g., "Northwest", etc.) preferably allows administrators to logically group multiple converged systems to allow relatively easy management and/or maintenance. As one example, assuming a group "Northwest" that is a plurality of individual systems that are each a target for either submitted tasks (i.e., tasks already sent to the individual systems for execution) or tasks being created (i.e., tasks not yet sent). Preferably, when an administrator adds/removes individual systems from the "Northwest" group, system manager 50 will prompt the administrators and preferably provide the option to automatically send/cancel the tasks to/from these individual systems being added/removed. These features are particularly advantageous when administrators are adding/removing systems on a regular basis. As another example of 'group' features that may be particularly beneficial, when an individual system (e.g., converged system 2) is installed, the installer can configure the individual system to be part of a particular group (e.g., "New Group"). When this system registers itself with system manager 50 (e.g., via a heartbeat message), preferably it will appear in the administrator's GUI as part of "New Group". Following this example, the system manager 50 preferably will prompt the administrator and provide the option to automatically manage the newly installed system as part of the other systems in that group (e.g., in a manner as discussed above in connection with the "Northwest" group example).

In accordance with certain preferred embodiments of the present invention, improved multi-site reporting (MSR) capabilities are provided. More than simply managing "devices" in a network via MSM as described herein, improved MSR capabilities in accordance with the present invention, which preferably may be a reporting subsystem operating with or as a part of MSM, more effectively manage business entities, such as branches or stores or other business units. In accordance with certain of such embodiments, this is more effectively implemented via MSM capabilities as described herein and via an abstraction layer that serves to separate the concept of physical equipment from the "locations" where the equipment is located.

As will be appreciated from the description provided herein, certain embodiments of MSM are in effect implemented to manage "locations" which have attributes assigned to them. Those attributes include, but are not limited to, the following: Current Status (Open, Closed, etc. . . . ), Existence (True, False), and Physical ID. In accordance with certain presently described embodiments, however, an abstraction layer is provided that enables locations to be managed separate from physical equipment. This abstraction layer provides important advantages in accordance with the present invention in that it allows users to more effectively deal with issues such as the following:

Continuity of data for locations that get closed. For example, if store X in the southwest region is closed in June, reporting data for that store should be available for the entire year and should indicate that the store was in the southwest region, even if reports are run in December. If an MSM/MSR capability was implemented based on physical equipment, physical equipment associated with the closed store effectively would have been deleted from the MSM network with the closing of this store, and this data would be lost or would not be classified correctly.

Continuity of data for locations that have physical equipment failure. It is possible and probable in real world environments that in large networks physical equipment may fail. In such event, physical equipment typically is replaced with other physical equipment. In the event that such a location swaps physical equipment, for example, the business abstraction layer enables the data associated with that location and the related MSM/MSR functionality to not be adversely affected.

Resolving management and data when physical equipment moves. In large organizations, it is common to move physical equipment from location to location. For example, as one location closes another may open, and physical equipment from the closed location may be reused at the new location. In accordance with such presently described embodiments, the abstraction layer may be utilized to resolve reporting and management issues associated with this movement. In accordance with certain of such embodiments, the reported data preferably reflects activity at the closed location for a portion of the period and reflect activity at the new location for the period beginning when it comes online, etc.

FIG. 20 illustrates how MSM in accordance with other embodiments of the present might manage devices—without utilizing the business abstraction layer as described herein. FIG. 21 illustrates how MSM in accordance with presently described embodiments may more effectively be used to manage locations (including improved reporting functionality) using such an abstraction layer. FIGS. 22 and 23 illustrate exemplary database structures that may be used to implement an abstraction layer in accordance with such embodiments of the present invention.

FIGS. 22-23, it should be noted, illustrate a brief example of the business abstraction layer features for purposes of understanding a simple use of the business abstraction layer in accordance with the present invention. It should be understood, however, that in alternative embodiments the abstraction layer concept of the present invention is utilized in a recursive and/or hierarchical or layer manner or in other forms, and such utilizations are within the scope of the present invention. Additionally, the example discussed herein illustrates one converged or other system at each store or location, but in accordance with such embodiments there is no limitation to the number of devices or the types of devices at each location. In fact, the location itself may have many more attributes associated with it, such as store hours, square footage, etc.

Thus, in accordance with the present invention, the abstraction layer may be applied in a repetitive fashion, thereby enabling a variety of applications such as service provider management products. A telecommunications company may manage services for a multiple companies that have multiple locations that have multiple pieces of equipment at each location. In accordance with the present invention, there is no limit as to how many times the abstraction layer can be applied. What is important is that, in accordance with the present invention, no matter how many abstraction layers are applied, MSM/MSR capabilities may be desirably implemented in a more business centric manner rather than a device centric manner.

In certain embodiments, it is preferable to allow an administrator to set error notification levels. Examples of error notification levels are: notify the administrators if X number of systems failed to execute the daily backup, notify the administrators if any traffic (e.g. voice and/or data traffic) on a system meets or exceeds the trunk and/or bandwidth capacity (e.g., thus requiring additional trunks and/or bandwidth), and notify the administrators if any systems failed to report their configuration. Other conditions may similarly be used as a basis for error notification. As part of the error notification procedure, in certain embodiments it is preferable to automatically page or call an administrator to alert them to the error.

After a request is constructed and a set of targeted systems has been chosen, MSM Server 42 preferably will be responsible for delivering the requests to each targeted system in the target list. As discussed previously in connection with FIG. 5, MSM Server 42 preferably will use sockets (preferably along with a queuing mechanism for reliability) to send the request to each converged system 2 in the target list. MSM Server 42 preferably will process status messages that are received from each converged system 2, and preferably will correlate those status messages with the request messages that were previously sent. In this manner MSM server 42 preferably allows the user to track the progress of each request on every targeted system, e.g., through the use of system manager 50.

In yet another improvement over certain conventional approaches, certain embodiments of the present invention preferably allow control information to be decoupled from data. In certain prior art approaches, content and configuration parameters are distributed together, resulting from the centralized approach, e.g., as shown in FIG. 2, with one consequence being that there is greater overhead associated with any particular software distribution task. The presently discussed embodiments, however, preferably rely on an improved decentralized approach that enables data information and control information to be separately distributed. As one example, if a particular task was to upgrade a large cab file for several different systems, and some sub-portion of the targeted systems already had access to the large cab file on their local subnet, certain embodiments of the present invention would allow the cab file to only be distributed to the systems that did not already have local access to it. Then, the configuration data associated with actually installing the cab file could be distributed separately. Such an architecture that enables configuration information to be decoupled from the raw data enables greater efficiency and improved bandwidth management, as well as a simpler overall management burden.

On the converged target system flow of FIG. 6, an individual targeted converged system 2 includes a system agent 52 that preferably receives messages from MSM server 42. Accordingly, the targeted system 2 preferably will act as a socket server that will be listening for messages. It preferably will interpret raw data coming in over the socket and then collect enough information to complete a valid message protocol message, preferably with the encryption approach discussed in FIG. 5. Once a complete request arrives at the target system 2, the target system preferably will look at the request to determine what should be done with it. For example, it preferably will check the type of message, perform any authentication that is required, and if necessary, pass the request to the scheduling logic of the target system 2. After a request is received and validated, preferably it will be stored in a persistent database; this preferably allows the list of received requests to be managed so that they are executed at an appropriate time. Preferably, when a request is determined to be ready for execution, the target system 2 preferably will examine the request and perform the actions that are spelled out in the request. At appropriate points in the handling of the request, the target system 2 preferably will report status information to MSM server 42 on the progress of the request. As examples, typical status messages might be: REQUEST_RECEIVED, REQUEST_SCHEDULED, REQUEST_COMPLETED, etc.

Figure 11:
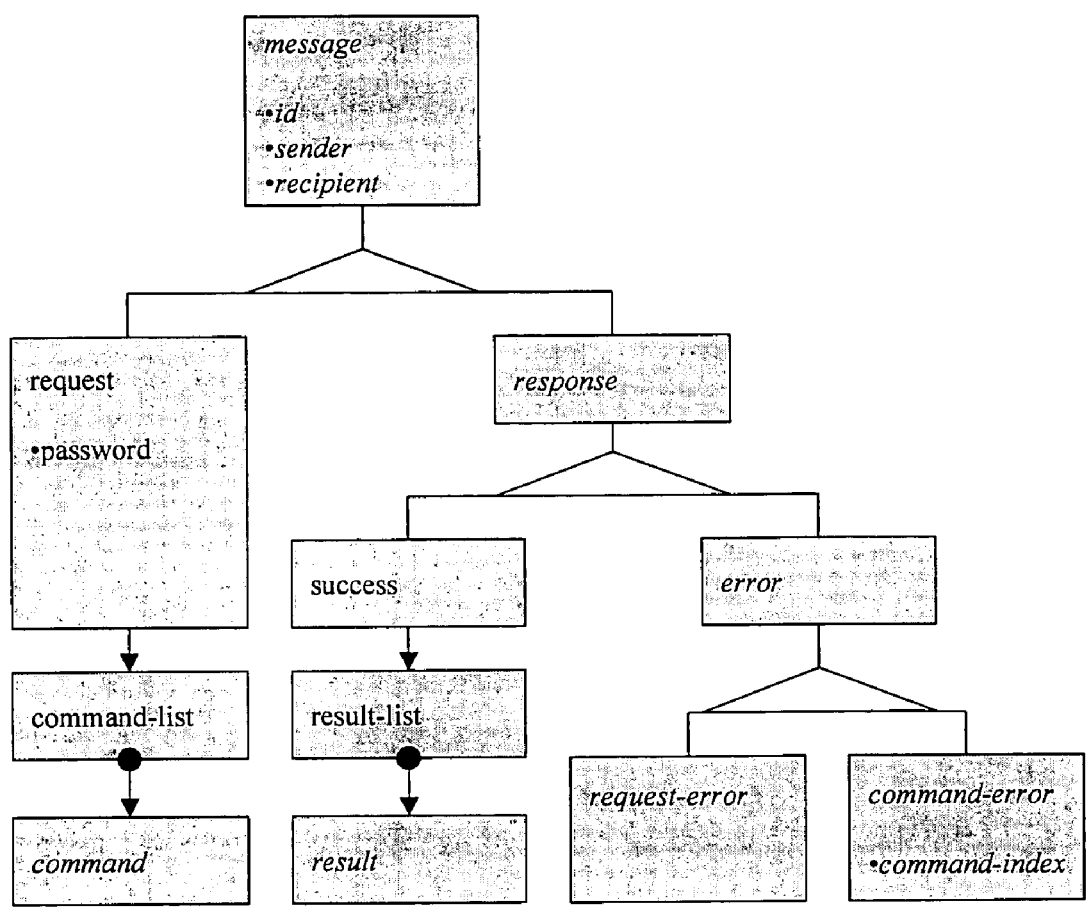

FIG. 11 depicts exemplary message types in keeping with the preferred embodiment. In addition to request-type messages, preferably response type messages are employed that may indicate success and failure conditions associated with a request.

FIG. 12 depicts an exemplary request-type message. In the case of request-type MPMs, it is preferable to include a password along with a list of commands to process. The password is preferably used by the recipient to authenticate the client on a particular socket. Preferably, once a client has been authenticated on a particular socket, the sender may continue to use that socket without supplying a password, e.g., for multiple commands in a command list.

FIG. 13 depicts exemplary response-type messages. In the case of response-type MPMs, it is preferable to allow sub-types such as 'success' and 'error' along with the id, sender, and recipient information. In this example, a 'success' response preferably is returned if the request has been processed successfully, and the 'error' response preferably is returned if the request could not be processed. In the case of success, a success response is preferably returned when no errors are encountered. Preferably, in addition to id, sender, and recipient values, a success message may contain a result list preferably representing a list of result elements that each preferably correspond to a command element in the original request.

Continuing the discussion of FIG. 11, in the course of processing a request, a variety of things may go wrong, which preferably result in an error condition being detected. While many different errors could occur, it is helpful for the present discussion to classify the types of errors into two broad categories: request-errors that occur before any individual commands could be processed, and command-errors that occur during the processing of a particular command. Preferably, the primary difference between the response messages that describe these two categories of errors is that the command-error category will preferably include a command-index to identify the index into the request's sequence of commands for the command that caused the error.

FIG. 14 describes examples of MPM error messages. As shown, it is preferable to have a request-error (e.g., invalid-request-error) that indicates the request message itself could not be parsed, validated, authenticated, etc. Additionally, it is preferable to have a command-error (e.g., insufficient-permission-error) indicating that the sender does not have sufficient permission to execute a particular command in the request message. Further, FIG. 14 describes another example command-error (e.g., invalid-modification-error) indicating that a particular command in the request message attempted to modify an object and violated protocol, e.g., violating either a XML-type convention or the schema used by the recipient of the request, thereby leaving the object in an invalid state.

With the error-message preferably able to identify the particular command in the request message that generated an error, the presently discussed embodiments preferably provide the ability to perform atomic transactions. In this case, atomic transactions may be multiple commands that preferably can either be conditionally executed, and/or preferably reversed if another command in the atomic transaction fails. Embodiments relating to atomic transactions are discussed above in further detail.

Figure 15:
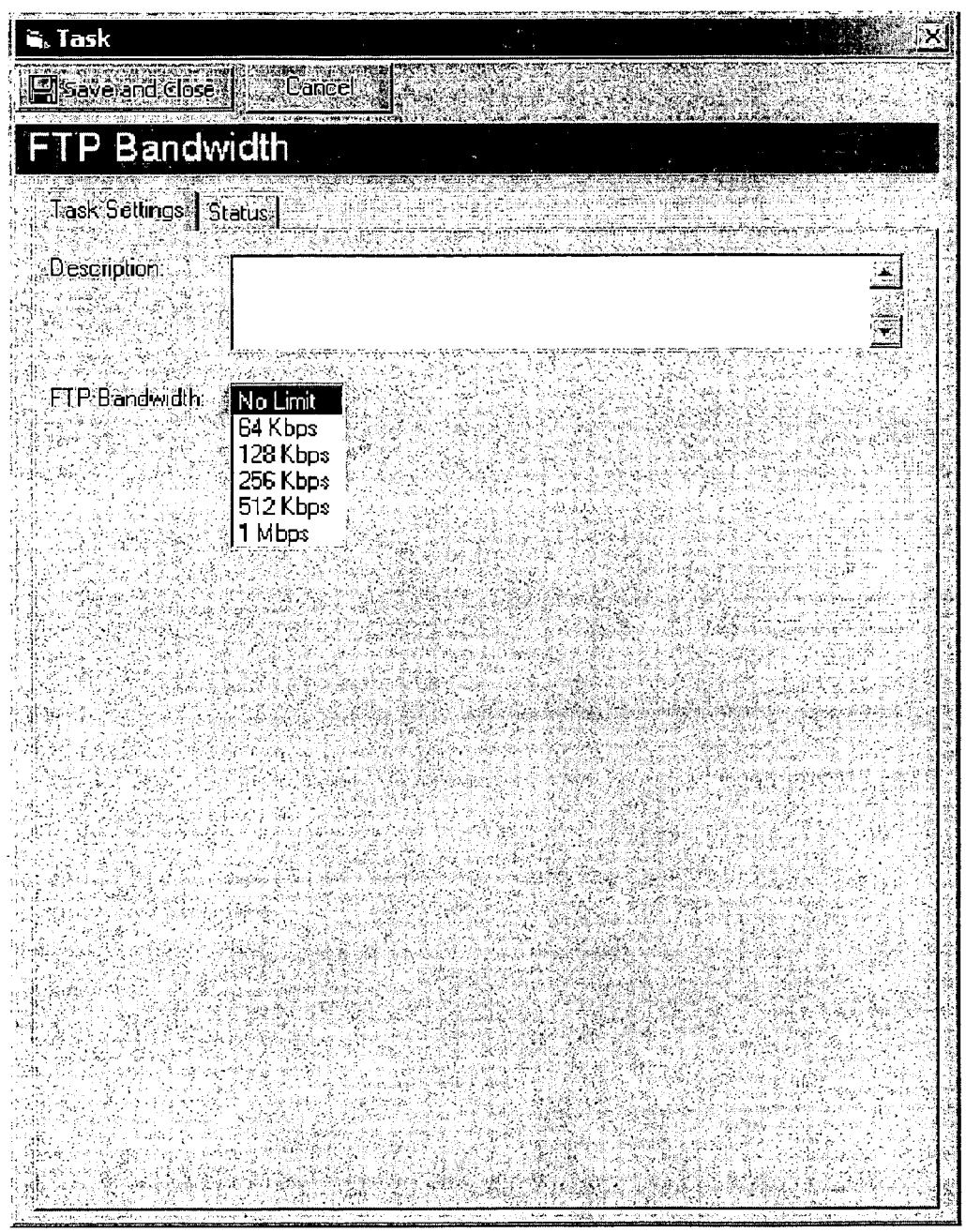
FIG. 15 illustrates exemplary preferred embodiments of a GUI interface associated with bandwidth maintenance, utilized in accordance with certain embodiments of the present invention.

FIG. 15 illustrates an exemplary GUI view associated with FTP bandwidth. This example view allows a user/administrator to configure the useable bandwidth, e.g., from a range between "no limit" and 64 Kbps. In this manner, it is preferable to provide a user with the ability to specify how much bandwidth may be occupied by an FTP transaction. This feature is advantageous as it allows a user/administrator to limit the effect of various FTP transactions (such as backups, etc.) on the overall network bandwidth.

Now that examples of the various types of MPMs have been discussed at a high level, the description will now focus in further to discuss may be considered the most important component of the request message, which is its list of commands.

FIG. 16 illustrates four examples of basic commands: 'value-of', 'update', 'append', and 'remove'. 'Value-of' is a command that preferably returns the literal contents of all matching elements. 'Update' preferably replaces the literal contents of all matching elements with the literal contents of the given value. 'Append' preferably adds the literal contents of the given value to the end of the literal contents of all matching elements. 'Remove' preferably removes all matching elements.

In the example of FIG. 16, 'append' preferably may be used to register a new record to a list. For example this preferably be used to register a new converged system 2 with MSM server 42. Similarly, 'remove' preferably may be used to cancel a particular converged system 2 from a particular subscription with MSM server 42. In the same manner, 'update', 'append', and 'remove' preferably may be used to modify a particular client system's permissions on a particular configuration service running on MSM server 42. These examples emphasize the simplicity and power of the presently discussed embodiments, as they preferably allow clients to access and manipulate subscription and permission data with the same power and flexibility with which they can access and manipulate the rest of the configurable data.

At this point in the discussion, it should be noted that there exist prior art protocols that could in theory be used for accessing and manipulating configuration data in a manner consistent with the present discussion. However, there are significant differences between the prior art approaches and preferred embodiment protocols of the present discussion. FIG. 17 depicts one such prior art approached called XUpdate (more details on XUpdate may be found on the internet, e.g., http://www.xmldatabases.org/projects/XUpdate-Use Cases/"). This prior art approach is fairly incomplete and ambiguously defined, and accordingly is more complex and less powerful than the preferred approaches discussed herein. The use of such a protocol to carry out MSM functions as described herein also is not known.

FIG. 17 illustrates an example XUpdate command to add a new record element to a database. FIG. 18 depicts an example of how a similar command can be architected in accordance with preferred embodiments of the present invention. As shown, FIG. 18 incorporates two changes to the syntax of FIG. 17. First, the 'select' attribute has been replaced, and second, the literal contents of the 'value' element appended to the 'list' node. The example of FIG. 18 shows that the present invention preferably allows the update of an entire portion of a configuration tree, replacing it with a new chunk. Conversely, as shown in FIG. 17, XUpdate only allows a particular text value to be manipulated. While these figures are merely simple examples, clearly XUpdate is aimed at broadly supporting XML documents, and is not narrowly targeted at configuration. Accordingly, adding elements in the present architecture using XUpdate is unnecessarily complicated (which such could be done in alternative embodiments of the present invention), as a special element tag must be used to define a new element, an attribute tag to give it attributes, and the remaining contents of the element as a literal XML chunk. Conversely, in the protocol of the present invention, the entire new element is preferably provided as one big literal XML chunk.

While many of the preferred embodiments of the present invention can involve an improvement over XUpdate, clearly certain implementations that incorporate XUpdate still may benefit from other aspects of the present invention, and accordingly are within the scope of the present invention.

As will be understood by a person of ordinary skill in the present art, the examples discussed here are representative of the full spirit and scope of the present invention. Additional variations, some of which are described here, incorporate many aspects of the present invention.

As will be appreciated from the discussion herein, MSM may be used to provide a mechanism to organize devices and locations in a network by allowing users to define a hierarchy. There preferably are provisions in MSM to enable modifications to the hierarchy as the organization changes. Furthermore, MSM preferably provides a mechanism to propagate those changes to other management applications.

An example of this type of synchronization is the reporting subsystem. When hierarchy changes are made in MSM, MSR preferably will detect those changes and reflect them when producing reports. For instance, Store A is defined to be in California. But California is a big state and managers want to subdivide California into two regions—North and South. With such a hierarchy modification, now Store A will be in North California. When the changes are made via MSM, MSM preferably passes the new hierarchy to the MSR application, and preferably future reports will now place Store A in North California. FIGS. 24-25 illustrate how the changes may be propagated from one system to the next.

In accordance with preferred embodiments, the mechanism for implementing this functionality is based upon a series of flags in the MSM database that are exposed and documented. External systems/applications (like MSR) can monitor these flags and then make intelligent decisions on how to modify their own hierarchical information. Illustrative tables and pertinent fields are illustrated in FIGS. 26-29.

As will be appreciated, by monitoring the flags in an "UpdatedTables" table, for example, an application such as MSR can zero in on the changes made in the hierarchy and location tables. Preferably, there is an "updateflag" associated with each table name that defines the hierarchy. If the flag is set for a given table, then this indicates that information in that table has been modified. Applications such as MSR can then go to the indicated table and update the part of the hierarchy that is affected by the indicated table. In essence, the "UpdatedTables" table acts as a "dirty bit" depository that can be referenced by other applications.

In accordance with certain preferred embodiments, with the MSM/MSR implementation the entire hierarchy preferably is exposed via such tables and is passed from one application to the other. As will be appreciated, however, this does not necessarily have to be the case. For reasons of performance, security, and data locking, for example, this mechanism allows systems to more granularly pass the hierarchy. Because access to the tables may be controlled via the main "UpdatedTables" entries, the information that is exposed and passed can be masked. The figures included herein shall be understood to be an example of how such a mechanism works in accordance with exemplary embodiments. The present invention should be understood to generally encompass the use of such a hierarchy, in which information defining attributes of all or part of the hierarchy, may be passed from one system/application to the another. In general, the present invention is directed to hierarchy sharing that can be applied in many business applications that rely on organizational hierarchies.

Also in accordance with such exemplary embodiments of the present invention, a handshaking mechanism is implemented. As illustrated in FIG. 30, in addition to synchronizing the hierarchies among systems as described earlier, MSM preferably provides a handshaking mechanism to indicate when telephony traffic data is ready for processing. In accordance with such exemplary embodiments, MSM preferably manages the collection and movement of data across the network. Preferably, MSM is responsible for getting data from the distributed systems to a central location via data transport mechanism such as, but not limited to, FTP, HTTP, Sockets, MSMQ, or MQSeries. Once the data is at the central data server, MSM preferably notifies dependent systems (for example, the MSR application), that the data is ready. Furthermore, MSM preferably specifies the details (server, directories, passwords, etc. . . . ) on how to access the data.

Similar to the mechanism used to synchronize hierarchies discussed earlier, MSM preferably uses a table in an MSM database to communicate with applications such as MSR. Preferably, after MSR finishes parsing and importing a set of data, the entry relating to that set of data is removed from the MSM database.

With respect to the exemplary specifics of MSM and MSR, the following steps describe the exact sequence that may occur in accordance with such embodiments.

1. A distributed system (or systems) may generate traffic data through the course of normal usage. That data preferably are stored in files that are categorized into Call Detail, Trunk Statistics, and Call Queuing.

2. In addition to the data files, the system(s) may generate a mapping file every day (or other time interval) that associates various "IDs" with their descriptions. Examples include, but are not limited to, extension numbers to names, group IDs to names, pilot numbers to descriptions, etc. . . . Any ID that could be ambiguous on a report preferably is mapped in this file.

3. The distributed system(s) preferably stores each type of data for a configured/predetermined number of days (or other time interval); for example, 60 days.

4. The MSM server instructs each distributed system how often it should package each set of data and where to send it. The schedule preferably is configurable via an MSM console/software interface.

5. Preferably, according the to MSM-provided schedule, each distributed system will compress the data and mapping files into, for example, what is know as a CAB file.

6. Once the files are packaged, preferably, each distributed system will transmit the CAB file to a configured data server.

7. Upon successful transmission of the data, preferably a message will be sent to the MSM server to indicate that the data is ready. It typically will describe what data was sent (CDR, Trunk, or CRQ), from what system it came from, which data server received the data, and where the data is located on the data server. MSM preferably puts this information in a "ReadyFiles" table.

8. In preferred embodiments, MSR will periodically scan the "ReadyFiles" table for data that is ready to be processed. If it finds any entries in the table, it preferably uses the information contained there to logon to the data server and retrieve the data.

9. MSR then preferably does processing of the data and imports it into its own database.

10. When MSR successfully completes its processing for that data, it preferably removes the "ReadyFiles" entry for that set of data.

Although the exemplary steps set forth above are specific to embodiments of the MSM and MSR applications as described herein, it should be understood that the process is applicable to any two systems where one collects data and the other is a consumer of that data.

It also should be understood that, in certain embodiments, many of the concepts of the MSM embodiments discussed herein are utilized with the MSR application as discussed herein. Although MSR is used in an exemplary manner with MSM, features thereof may be utilized separate from the specific attributes of MSM described herein. Additional aspects of the inter-relation between MSM and MSR in certain embodiments will now be described.:

1. MSM and MSR preferably both separate the control of data transmission from the data transmission itself. This desirably allows flexibility in how a customer's network may be utilized. For example, parameters such as bandwidth, transmission protocol, transmission paths, and data servers may be specified via the control mechanism. Then the actual transmission preferably is handed over to the network according to those parameters. This attribute of preferred embodiments provides substantial advantages in that the control protocol can utilize a different network than the data transmission. Preferably, MSM/MSR can utilize the network in a very intelligent fashion because of this architecture. As an example, control can be passed via sockets over a satellite network, where latency is high, but coverage universal, while data transmission preferably is passed through landlines where throughput is higher and more reliable. The point is that, in accordance with embodiments of the present invention, MSM/MSR can be tuned to use the network assets of the particular customer.

2. As will be appreciated, the scalability advantages available with MSM in accordance with the present invention also may be achieved via the MSR application. MSM desirably utilizes the "edge of the network" to do much of the work of gathering data, and this same advantage is applicable to MSR since MSR's data gathering duties preferably are distributed across a large array of devices on the network.

3. Since the flow of data preferably is managed via MSM, it should be understood that management attributes of MSM also may be applied to the utilization of MSR. As will be appreciated, MSM may be utilized to set up the tasks of gathering data that may be reported, including the desirably use of constructs such as "CDR", "CMS", and "Trunk Reports". In accordance with certain preferred embodiments, in effect portions of MSR are imbedded in MSM, conveying additional advantages in accordance with the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for providing a report database comprising reporting information gathered from a plurality of localized devices comprising the steps of:
    providing a server system to coordinate management activities for a plurality of localized devices;
    providing an abstraction layer that references the localized devices as "locations" rather than physical equipment, wherein the "locations" are defined by location identification information distinct from an IP address;
    wherein the server system communicates with an individual device of the plurality of localized devices via the abstraction layer to request software distribution information without requiring user initiation at the individual device;
    wherein the software distribution information provides the server system with information sufficient to generate reporting information comprised of "locations";
    wherein the reporting information is gathered from two or more localized devices and imported into the report database,
    wherein communications between the server system and the individual device are performed using a protectable communications protocol that includes an atomic error handling capability to enable a plurality of transaction instructions to be reversed upon an error in one of the plurality of transaction instructions.

2. The method of claim 1, wherein communications between the server system and the individual device using the protectable communications protocol communicate via sockets.

3. The method of claim 1, wherein the software distribution information provide the individual device with information sufficient to establish a direct link with a software distribution server in order to receive software distribution data.

4. The method of claim 3, wherein the direct link comprises an FTP link.

5. The method of claim 3, further comprising the step of providing a graphical user interface software application, wherein bandwidth characteristics associated with the FTP link are configurable via the graphical user interface software application.

6. The method of claim 3, further comprising the step of providing a plurality of FTP servers associated with backup, distribution, and or reporting tasks, wherein the FTP link provides a communication path between the server system and one or more of the plurality of FTP servers.

7. The method of claim 6, wherein at least one FTP server is located externally to a private network associated with the server system.

8. In a system having a plurality of localized computing devices in a plurality of geographically diverse sites, wherein information specific to each geographically diverse site is generated over time through at least one localized computing device associated with each geographically diverse site, a method for providing a report database comprising reporting information gathered from a plurality of localized devices, comprising:
    providing a server system to manage information associated with each geographically diverse site;
    providing each geographically diverse site with at least one localized computing device, wherein the localized computing device may be transferred from a first geographically diverse site to a second geographically diverse site or be "out of service" after some period of time; and
    providing an abstraction layer that enables management of information for each geographically diverse site distinct from the plurality of localized computing devices, wherein "locations" are defined by location identification information distinct from an IP address;
    wherein the reporting information for the "locations" is gathered from a plurality of localized computing devices and imported into a report database,
    wherein communications between the server system and one or more of the plurality of localized computing devices are performed using a protectable communications protocol that includes an atomic error handling capability to enable a plurality of transaction instructions to be reversed upon an error in one of the plurality of transaction instructions.

9. A method of claim 8, wherein each geographically diverse site comprises a business entity.

10. A method of claim 8, wherein the server system communicates with a localized computing device via the protectable communications protocol to provide software distribution instructions to the localized computing device.

11. A method of claim 8, wherein the system comprises a communications system, and wherein at least one of the localized computing devices comprises a localized communications device.

12. In a system having a plurality of computing devices, wherein reporting information specific to each computing device is generated over time, a method for providing a report database comprising the reporting information gathered from the computing devices, comprising:
    providing a server system to manage the computing devices;
    providing an abstraction layer that enables management of information for each computing device, wherein "locations" are defined by location identification information;
    wherein the reporting information for the "locations" is gathered from a plurality of computing devices and imported into a report database,
    wherein communications between the server system and one or more of the plurality of computing devices are performed using a protectable communications protocol that includes an atomic error handling capability to enable a plurality of transaction instructions to be reversed upon an error in one of the plurality of transaction instructions.

13. The method of claim 12, wherein the server system communicates with an individual computing device to request software distribution information without requiring user initiation at the individual computing device; and
    wherein the software distribution information provides the individual computing device with information sufficient to establish a direct link with a software distribution server in order to receive software distribution data.

14. The method of claim 13, wherein the direct link comprises an FTP link.

15. The method of claim 14, further comprising the step of providing a graphical user interface software application, wherein bandwidth characteristics associated with the FTP link are configurable via the graphical user interface software application.

16. The method of claim 14, further comprising the step of providing a plurality of FTP servers associated with backup, distribution, and or reporting tasks, wherein the FTP link provides a communication path between the server system and one or more of the plurality of FTP servers.

17. A method of claim 12, wherein the server system communicates with a computing device via the protectable communications protocol to provide software distribution instructions to the computing device.

* * * * *